United States Patent
Ukai et al.

(10) Patent No.: US 7,235,325 B2
(45) Date of Patent: Jun. 26, 2007

(54) SINGLE CELL FOR A SOLID OXIDE FUEL CELL

(75) Inventors: Kenji Ukai, Tokai (JP); Kouji Hisada, Tokai (JP); Kazuo Hata, Suita (JP); Norikazu Aikawa, Suita (JP); Masatoshi Shimomura, Suita (JP)

(73) Assignees: Toho Gas Co., Ltd., Nagoya-Shi (JP); Nippon Shokubai Co., Ltd., Chuo-Ku (JP)

( * ) Notice: Subject to any disclaimer, the term of this patent is extended or adjusted under 35 U.S.C. 154(b) by 58 days.

(21) Appl. No.: 11/008,843

(22) Filed: Dec. 10, 2004

(65) Prior Publication Data

US 2005/0255355 A1 Nov. 17, 2005

(30) Foreign Application Priority Data

May 11, 2004 (JP) ............................. 2004-140546

(51) Int. Cl.
*H01M 4/86* (2006.01)
(52) U.S. Cl. ..................... 429/40; 429/33; 429/32; 429/30; 429/45; 429/41
(58) Field of Classification Search .............. 429/40, 429/33, 32, 30, 45, 41
See application file for complete search history.

(56) References Cited

U.S. PATENT DOCUMENTS 6,849,354 B2 * 2/2005 Hara et al. ................. 429/33
6,893,760 B2 * 5/2005 Shibata et al. .............. 429/30
2002/0048699 A1 4/2002 Steele et al.

FOREIGN PATENT DOCUMENTS

| DE | 197 35 781 A1 | 2/1999 |
|---|---|---|
| EP | 1 383 195 A2 | 1/2004 |
| JP | 5-225820 | 9/1993 |
| JP | 06-107462 * | 4/1994 |
| JP | 2004-055326 A1 | 2/2004 |
| WO | 03/098724 A1 | 11/2003 |
| WO | 2004/034492 A1 | 4/2004 |

OTHER PUBLICATIONS

K. Ukai et al., "*Development of 1kW SOFC System Using Sc-TZP Electrolyte Supported Cell,*" The 12th Symposium on Solid Oxide Fule Cells in Japan, Extended Abstracts, The Solid Oxide Fuel Cell Society of Japan, Tokyo (Dec. 11-12, 2003), pp. 6-11.

* cited by examiner

*Primary Examiner*—Laura Weiner
(74) *Attorney, Agent, or Firm*—Burr & Brown

(57) ABSTRACT

A single cell for SOFC operating at low temperatures, is provided, including a first solid electrolyte with oxide ion conductivity at 800° C. of 0.015 S/cm or more and bending strength of 600 MPa or more, a fuel electrode and bonded to one side of the first electrolyte, comprised of a cermet of a catalyst and a second solid electrolyte with a conductivity of 0.08 S/cm or more, and an air electrode bonded to the other side of the first electrolyte comprised of a compound of first perovskite type oxide with a third solid electrolyte. The electrodes are coated with fuel and air electrode contact layers, respectively.

4 Claims, 5 Drawing Sheets

SINGLE CELL FOR A SOLID OXIDE FUEL CELL

BACKGROUND OF THE INVENTION

1. Field of the Invention

The present invention relates to a single cell for a solid oxide fuel cell operating at low temperatures, more particularly to a single cell for a solid oxide fuel cell operating at low temperatures which is suitable for a distributed power source, a cogeneration system or the like in urban areas.

2. Description of Related Art

A solid oxide fuel cell (hereinafter referred to as an "SOFC") is a fuel cell in which a solid electrolyte exhibiting oxide ion conductivity is used as an electrolyte. In the SOFC, since the electrolyte is solid, there is no problem of dissipation of the electrolyte, and long life can be expected. Further, as an operating temperature is as high as about 1000° C., the utility value of waste heat is high. Furthermore, as an output power density is high, the SOFC can be expected to be compact and of high efficiency.

In general, structures of this kind of SOFC are broadly divided into those of planar type, tubular type, and integral type. Among them, the planar type SOFC has advantages of high generation efficiency because internal resistance is comparatively low, and of high output power density per unit volume because thin cells are stacked.

The planar type SOFC is further broadly divided into those of a self-supporting electrolyte film type and a supported electrolyte film type. The former one ordinarily has a structure in which a plurality of single cells are stacked via a separator, wherein a fuel electrode supplied with a fuel gas such as hydrogen and city gas is bonded to one side of a planar self-supporting solid electrolyte, and an air electrode supplied with an oxidant gas such as air and oxygen is bonded to the other side of the solid electrolyte.

For the solid electrolyte used in a single cell for the SOFC, yttria-stabilized zirconia (hereinafter sometimes referred to as "YSZ") is conventionally used. However, YSZ is of high internal resistance and shows low oxide ion conductivity. Therefore, recently, in view of improving output power density or the like of the SOFC, attention has been directed at scandia-stabilized zirconia (hereinafter sometimes referred to as "ScSZ") with oxide ion conductivity higher than YSZ, and various researches have been conducted.

In addition, generally, for a fuel electrode material, a cermet of Ni and YSZ containing 8 mol % $Y_2O_3$ (hereinafter sometimes referred to as "Ni-8YSZ") or the like is used. For an air electrode material, (La, Sr) $MnO_3$ or the like is used. For a separator material, $LaCrO_3$ or the like is used.

The present applicants have confirmed through researches that since ScSZ of a tetragonal crystal shows high oxide ion conductivity and is excellent in mechanical characteristics such as strength and toughness, the single cell using this as the solid electrolyte and the SOFC made by stacking a plurality of the single cells show excellent generating performance and reliability (see Japanese Patent Application Unexamined Publication No. 2004-055326).

However, though the above single cell and SOFC are excellent in generating performance and reliability withstanding practical use, the operating temperature is still as high as the order of about 950° C. Therefore, more improvements have been required for achieving low-temperature operation.

This is because, if operating characteristics at low temperatures can be improved without sacrificing the generating performance and reliability, great promise is shown for early commercialization.

Incidentally, in order to achieve the low-temperature operation with the above single cell and SOFC, materials suitable for the low-temperature operation should be respectively selected for the constituting members. However, depending on the combination of the materials, the generating performance and reliability could be contrarily impaired.

Further, in the single cell and SOFC, different types of constituting members are bonded to or bought in contact with each other, i.e., the solid electrolyte and the electrodes are bonded to each other and the electrodes are brought in contact with the separators. Therefore, not only material properties of the respective constituting members but also an interaction between the different types of members must be fully considered.

As mentioned above, for the single cell and SOFC, it is important to make comprehensive developments in consideration of the material properties of the respective constituting members and the interaction between the different types of members. Especially, in order to improve cell performance under disadvantageous conditions for the single cell and SOFC, i.e., the low-temperature operation, development techniques as mentioned above take on more importance.

SUMMARY OF THE INVENTION

An object of the invention is to overcome the problems described above and to provide a single cell for an SOFC operating in a low-temperature region which is more excellent in generating performance and reliability than a conventional one even at low temperatures of the order of 600 to 900° C. Another object of the invention is to provide a single cell for an SOFC operating at low temperatures which is excellent in adhesion to a separator with low current-collecting loss when used in an SOFC.

To achieve the objects and in accordance with the purpose of the present invention, a single cell for an SOFC operating at low temperatures has a first solid electrolyte of which oxide ion conductivity at 800° C. is 0.015 S/cm or more and bending strength is 600 MPa or more, a fuel electrode comprised of a cermet of a catalyst and a second solid electrolyte of which the oxide ion conductivity at 800° C. is 0.08 S/cm or more, bonded to one side of the first solid electrolyte, and an air electrode comprised of a compound of first perovskite type oxide with a third solid electrolyte, bonded to the other side of the first solid electrolyte, and an intermediate layer comprised of a fourth solid electrolyte, optionally interposed between the air electrode and the first solid electrolyte.

Preferably in the above single cell, the first solid electrolyte is scandia-stabilized zirconia in which 3 to 6 mol % $Sc_2O_3$ is contained and a crystal phase is mainly structured by a tetragonal crystal, or a dispersion strengthened solid electrolyte in which 0.3 to 5 wt % $Al_2O_3$ is dispersed based on scandia-stabilized zirconia containing 3 to 6 mol % $Sc_2O_3$ and the crystal phase is mainly structured by a tetragonal crystal.

Preferably in the above single cell, the catalyst is Ni, and the second solid electrolyte is scandia-stabilized zirconia containing 9 to 12 mol % $Sc_2O_3$.

Preferably in the above single cell, the second solid electrolyte is scandia-stabilized zirconia in which more than 0 mol % and not more than 2 mol % of at least one oxide selected from the group consisting of $Y_2O_3$ and $CeO_2$ is contained and the crystal phase is mainly structured by a cubic crystal.

Preferably in the above single cell, the first perovskite type oxide is at least one perovskite type transition metal oxide selected from the group consisting of $La_{1-x}Sr_xCo_{1-y}Fe_yO_3$ (wherein $0.2 \leq x \leq 0.6$, $0.6 \leq y \leq 0.9$), $Pr_{1-x}Sr_xMnO_3$ (wherein $0.2 \leq x \leq 0.6$) and $La_{1-x}Sr_xCoO_3$ (wherein $0.1 \leq x \leq 0.6$), and the third solid electrolyte is a mixed solid electrolyte comprised of one of yttria-stabilized zirconia containing 8 to 10 mol % $Y_2O_3$, scandia-stabilized zirconia containing 9 to 12 mol % $Sc_2O_3$, a ceria-based solid solution containing 10 to 35 mol % of at least one oxide selected from the group consisting of $Gd_2O_3$, $Y_2O_3$ and $Sm_2O_3$, and a combination thereof.

Preferably in the above single cell, the fourth solid electrolyte is a ceria-based solid solution containing 10 to 35 mol % of at least one oxide selected from the group consisting of $Gd_2O_3$, $Y_2O_3$ and $Sm_2O_3$.

Preferably, the above single cell further has a fuel electrode contact layer comprised of a fuel electrode contact material containing at least a first metal powder, coating a surface of the fuel electrode, and an air electrode contact layer comprised of an air electrode contact material containing at least a second metal powder and a second perovskite type oxide power, coating a surface of the air electrode.

Preferably in the above single cell, the first metal powder is one of an Ni powder and an Ni alloy powder.

Preferably in the above single cell, the second metal powder is one of an Ag powder, an Ag alloy powder, and a mixed powder prepared by mixing at least one of the Ag powder and the Ag alloy powder with a powder of at least one noble metal selected from the group consisting of Pd, Ru, Pt, Rh, Ir and Au or an alloy powder of the noble metals, and the second perovskite type oxide is $La_{1-x}Sr_xCoO_3$ (wherein $0.1 \leq x \leq 0.6$).

Preferably in the above single cell, the fuel electrode contact material and the air electrode contact material are in a form of slurry containing a binder.

Preferably in the above single cell, surface roughness of the fuel electrode falls within ranges of 5 to 25 μm in maximum roughness depth Rmax and 3 to 20 μm in average roughness height Rz, and surface roughness of the air electrode falls within ranges of 3 to 20 μm in maximum roughness depth Rmax and 2 to 18 μm in average roughness height Rz, when measured by a laser optical non-contact 3D shape measurement device.

Preferably in the above single cell, surface roughness of the fuel electrode contact layer falls within ranges of 5 to 25 μm in maximum roughness depth Rmax and 3 to 22 μm in average roughness height Rz, and surface roughness of the air eletrode contact layer falls within ranges of 3 to 24 μm in maximum roughness depth Rmax and 2 to 20 μm in average roughness height Rz, when measured by the laser optical non-contact 3D shape measurement device.

Preferably in the above single cell, surface roughness of the first solid electrolyte falls within ranges of 3 to 15 μm in maximum roughness depth Rmax and 2 to 10 μm in average roughness height Rz, when measured by the laser optical non-contact 3D shape measurement device.

Preferably in the above single cell, an area specific resistance calculated according to Formula 1 below falls within a range of 0.45 to 0.9 Ωcm² when current density is 0.5 A/cm² in a case where a power generating test is conducted at 800° C. using a platinum mesh as a current collector and via a separator of alumina while hydrogen is used as a fuel gas supplied to the fuel electrode and air is used as an oxidant gas supplied to the air electrode.

Area Specific Resistance [Ωcm²]=(Open Circuit Voltage [V]−Output Voltage [V])/Current Density [A/cm²]   Formula 1:

Preferably in the above single cell, fractures and cracks are not substantially identified through visual observations after the single cell is sandwiched between dense plates being larger than a surface area of the single cell and having a smooth surface and a load is imposed at 0.2 kgf/cm² all over the single cell.

In the single cell consistent with the present invention, the first solid electrolyte combining oxide ion conductivity with mechanical characteristics is employed; therefore, sufficient generating performance is obtained and reliability as a structure becomes excellent. Further, since the fuel electrode is comprised of the cermet of the catalyst and the second solid electrolyte exhibiting high oxide ion conductivity and the air electrode is comprised of the compound of the first perovskite type oxide and the third solid electrolyte, electrode activity of the fuel and air electrodes is high and a cell reaction is stimulated even in a low-temperature region of the order of 600 to 900° C. Therefore, according to the single cell consistent with the present invention, low-temperature operating characteristics can be improved without sacrificing the generating performance and reliability. Furthermore, if the intermediate layer is interposed between the first solid electrolyte and the air electrode, the reaction between a first solid electrolyte material and an air electrode material is suppressed, so that reduction in the generating performance due to reacted products can be suppressed.

Further, in the above single cell, in a case where scandia-stabilized zirconia or the dispersion strengthened solid electrolyte which is especially excellent in oxide ion conductivity and mechanical characteristics such as strength and toughness is used as the first solid electrolyte, a low-temperature operation is easily achieved while maintaining the generating performance and reliability. Further, scandia-stabilized zirconia or the dispersion strengthened solid electrolyte is excellent in a handling property; therefore, there is an advantage that a planar type single cell of a self-supporting film type operating at low temperatures is easily produced.

Still further, in the above single cell, in a case where Ni is used as the catalyst and scandia-stabilized zirconia containing 9 to 12 mol % $Sc_2O_3$ is used as the second solid electrolyte, the electrode activity of the fuel electrode is high. Therefore, the low-temperature operation is easy to achieve.

Still further, in the above single cell, in a case where scandia-stabilized zirconia containing 9 to 12 mol % $Sc_2O_3$ in which a trace amount of predetermined oxide is further contained and a crystal phase is mainly structured by a tetragonal crystal is used as the second solid electrolyte, the electrode activity of the fuel electrode is especially excellent. Therefore, the low-temperature operation is even easier to achieve.

Still further, in the above single cell, in a case where at least one perovskite type transition metal oxide selected from the group consisting of $La_{1-x}Sr_xCo_{1-y}Fe_yO_3$ (wherein $0.2 \leq x \leq 0.6$, $0.6 \leq y \leq 0.9$), $Pr_{1-x}Sr_xMnO_3$ (wherein $0.2 \leq x \leq 6.6$) and $La_{1-x}Sr_xCoO_3$ (wherein $0.1 \leq x \leq 0.6$) is used as the first perovskite type oxide, and yttria-stabilized zirconia containing 8 to 10 mol % $Y_2O_3$, scandia-stabilized zirconia containing 9 to 12 mol % $Sc_2O_3$, a ceria-based solid solution-containing 10 to 35 mol % of at least one oxide selected from the group consisting of $Gd_2O_3$, $Y_2O_3$ and $Sm_2O_3$, or a mixed solid electrolyte of them is used as the third solid electrolyte, there are the following advantages.

That is, conventionally, for an air electrode material, (La, Sr) $MnO_3$, a compound of it and yttria-stabilized zirconia or the like is used. However, these air electrode materials have great electrode resistance and inferior electrode activity in the low-temperature region of the order of 600 to 900° C. In addition, especially, the reduction in the electrode activity in the low-temperature region is more noticeable in the air electrode than the fuel electrode. Therefore, it is difficult to improve the low-temperature operating characteristics of the single cell by using them.

In contrast, the air electrode material comprised of a compound of the above first perovskite type oxide with the above third solid electrolyte has smaller electrode resistance than the conventional air electrode materials even in the low-temperature region of the order of 600 to 900° C., and is especially excellent in the electrode activity. Therefore, the low-temperature operation is easy to achieve.

In addition, in the above signal cell, if the air electrode material contains $La_{1-x}Sr_xCo_{1-y}Fe_yO_3$, the reaction between stabilized-zirconia of the first solid electrolyte and $La_{1-x}Sr_xCo_{1-y}Fe_yO_3$ is apt to occur. However, in a case where the ceria-based solid solution containing predetermined oxide in a predetermined amount is used as the intermediate layer, the reaction therebetween can be efficiently suppressed; therefore, the reduction in the generating performance due to the reacted products can be suppressed.

Still further, in the single cell consistent with the present invention, in a case where the fuel electrode surface is coated with the fuel electrode contact layer and the air electrode surface is coated with the air electrode contact layer, if a plurality of the single cells are stacked via the separators to make the SOFC, the interstices between the respective electrodes and the separators are filled by the respective electrode contact layers. As a result, the adhesion between the respective electrodes and the separators is enhanced, and contact resistance is decreased to improve current collecting efficiency. Thereby, current generated by power generation of the single cell can be collected without great loss, and the generating performance of the SOFC can be improved.

Still further, in the above single cell, in a case where the Ni powder or the Ni alloy powder comparatively less expensive is used as the first metal powder in the fuel electrode contact material, the object of the fuel electrode contact layer can be fully achieved while suppressing production cost of the single cell.

Still further, in the above single cell, in a case where the Ag powder or the Ag alloy powder, or the mixed powder prepared by mixing one or both of them with a predetermined noble metal powder or a predetermined noble metal alloy powder is used as the second metal powder in the air electrode contact material and $La_{1-x}Sr_xCoO_3$ is used as the second perovskite type oxide, there are the following advantages.

That is, in such a case, electric conductivity of the air electrode contact layer is extremely high, and resistance in a surface direction of the first solid electrolyte is greatly reduced. As a result, the reduction in the cell performance in accordance with upsizing of the cell is easy to prevent and practicality is enhanced. In addition, the electric conductivity of the air electrode hardly affects the cell performance; therefore, flexibility in designing the air electrode (a material composition, thickness, porosity and the like) is increased, and the practicality is thereby also enhanced.

Still further, in the above single cell, in a case where the fuel and air electrode contact materials are in the form of slurry containing the binder, a coating property when painted on each electrode surface is excellent. In addition, favorable adhesion condition is easily obtained between each electrode contact layer and the separator. Further, when the SOFC is heated at the time of initial operation while keeping the favorable adhesion condition, microscopic asperities at the separator surface can be efficiently absorbed.

Still further, in the above single cell, in a case where the surface roughness Rmax and Rz of each electrode measured by the laser optical non-contact 3D shape measurement device fall within specified ranges and the surface roughness Rmax and Rz of each electrode contact layer measured by the laser optical non-contact 3D shape measurement device fall within specified ranges, the adhesion between the electrodes or the electrode contact layers and the separators is further enhanced, and the contact resistance is decreased to further improve the current collecting efficiency, so that the generating performance of the SOFC is easy to improve. In addition, these single cells can favorably maintain permeability of the electrodes, hardly resulting in the reduction in the generating performance.

Still further, in the above single cell, in a case where the surface roughness Rmax and Rz of the first solid electrolyte measured by the laser optical non-contact 3D shape measurement device fall within specified ranges, the adhesion between the first solid electrolyte and each electrode in a boundary is improved, and the reduction in the generating performance due to separation of them and the like is hard to occur, resulting in the excellent generating performance and reliability of the single cell.

Still further, in the above single cell, in a case where the power generating test is conducted under certain conditions, if the area specific resistance calculated by Formula 1 at fixed current density falls within a specified range, a power generating property at low temperatures and the like become more excellent than the single cell as described in Japanese Patent Application Unexamined Publication No. 2004-055326 and the like.

Still further, in the above single cell, it is preferable that fractures and cracks are not substantially presented through visual observations after a predetermined load test. In general, at the time of handling in production procedure of the single cell and the like, if fractures and cracks are generated in the single cell, they are hard to identify under static pressure conditions. Therefore, there are some cases where the SOFC is assembled from defective single cells, and in these cases, a cell breakage ratio at the time of assembling the SOFC becomes great. Also, the reliability of thus obtained SOFC is lowered.

However, if the above load test is conducted on the single cell, fractures and cracks can be easily identified through visual observations. Therefore, conforming single cells and defective single cells can be easily differentiated. Further, if the conforming single cells are assembled into the SOFC, the cell breakage ratio at the time of assembly is decreased. Additionally, the SOFC of high reliability becomes easily obtained.

Additional objects and advantages of the invention are set forth in the description which follows, are obvious from the description, or may be learned by practicing the invention. The objects and advantages of the invention may be realized and attained by the single cell in the claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE INVENTION

A detailed description of one preferred embodiment of a single cell for an SOFC embodied by the present invention is provided below with reference to the accompanying drawings.

[1. Schematic Configuration of Single Cell for SOFC Operating at Low Temperatures]

The single cell consistent with the present invention at least has a structure in which a fuel electrode is bonded to one side of a first solid electrolyte, and an air electrode is bonded to, optionally via an intermediate layer, the other side of the first solid electrolyte. Further, there are some cases where the surface of the fuel electrode is coated with a fuel electrode contact layer, and the surface of the air electrode is coated with an air electrode contact layer.

Figure 1A:
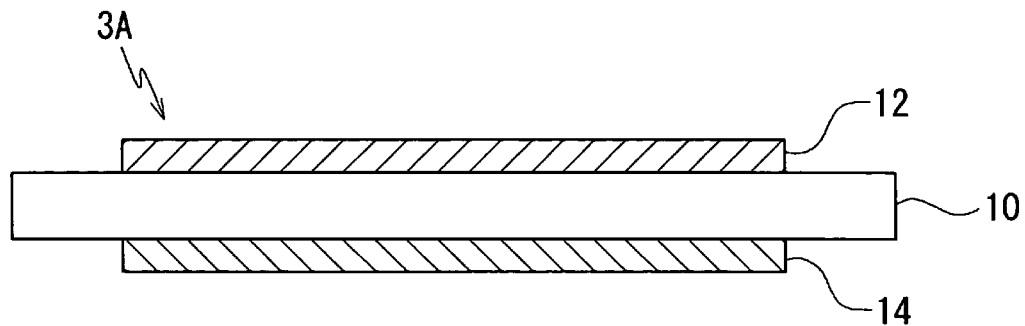
FIGS. 1A to 1D are schematic diagrams of cell structures of a three-layered cell, a four-layered cell, a five-layered cell, and a six-layered cell consistent with the present invention.
Figure 1B:
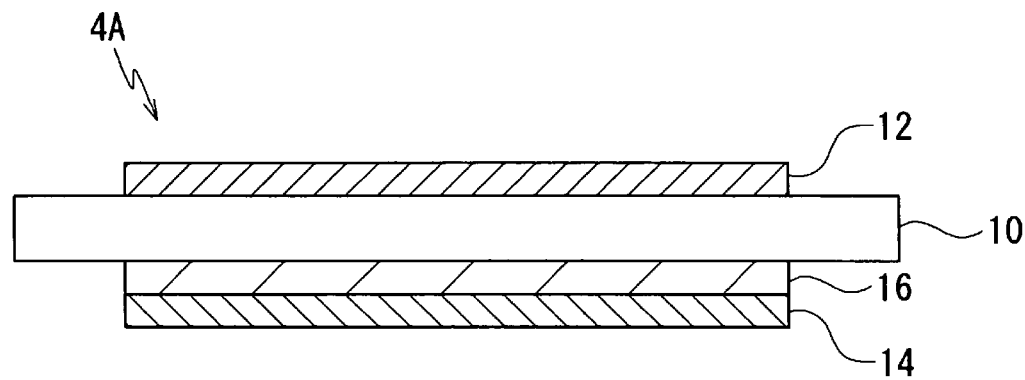
Figure 1C:
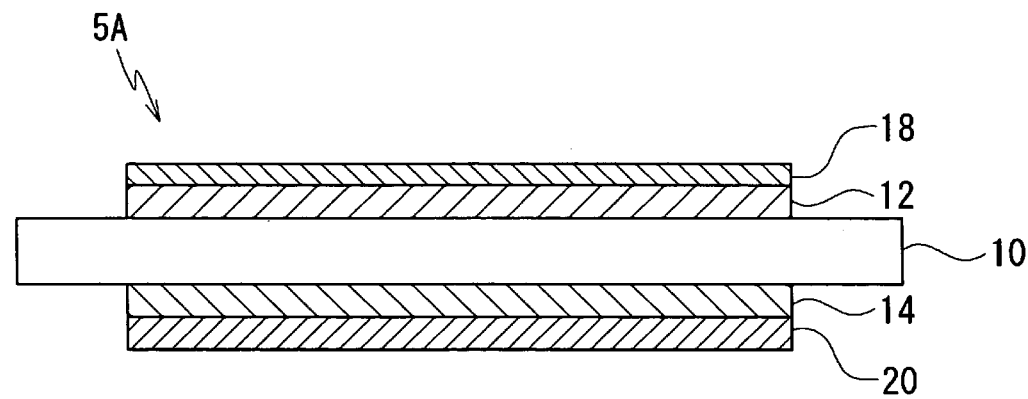
Figure 1D:
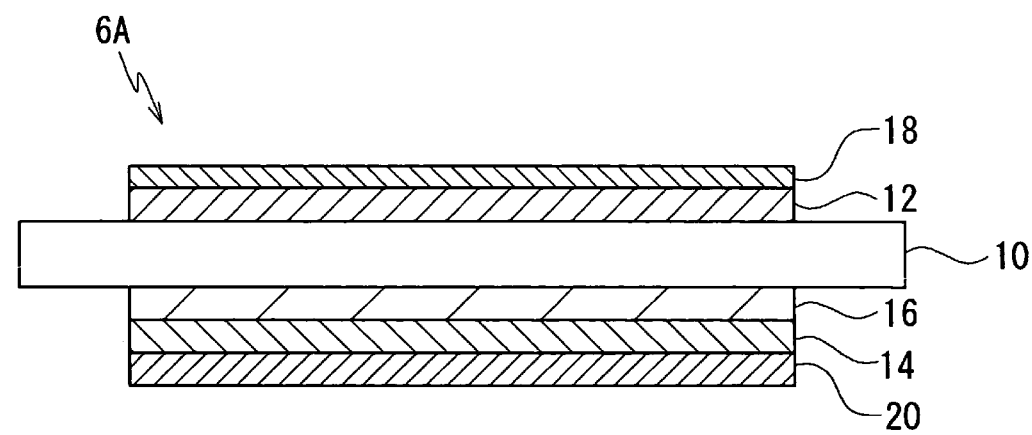

In detail, the single cell is either of a three-layered cell 3A being a stack of three layers of a fuel electrode 12, a first solid electrolyte 10, and an air electrode 14 as shown in FIG. 1A; a four-layered cell 4A being a stack of four layers of the fuel electrode 12, the first solid electrolyte 10, an intermediate layer 16, and the air electrode 14 as shown in FIG. 1B; a five-layered cell 5A being a stack of five layers of a fuel electrode contact layer 18, the fuel electrode 12, the first solid electrolyte 10, the air electrode 14, and an air electrode contact layer 20 as shown in FIG. 1C; and a six-layered cell 6A being a stack of six layers of the fuel electrode contact layer 18, the fuel electrode 12, the first solid electrolyte 10, the intermediate layer 16, the air electrode 14, and the air electrode contact layer 20 as shown in FIG. 1D.

Each cell is operated in a low-temperature region of the order of 600 to 900° C., preferably 700 to 850° C., more preferably 750 to 850° C.

Hereinafter, constituting members of each cell will be described in detail. In the following description, the fuel electrode and the air electrode are sometimes collectively referred to as "electrodes", and the fuel electrode contact layer and the air electrode contact layer are sometimes collectively referred to as "electrode contact layers".

[1.1 First Solid Electrolyte]

In the present invention, for the first solid electrolyte, a solid electrolyte in which oxide ion conductivity at 800° C. is at least 0.015 S/cm or more, preferably 0.020 S/cm or more, more preferably 0.025 S/cm or more, and bending strength is at least 600 MPa or more, preferably 700 MPa or more, more preferably 800 MPa or more, still more preferably 1000 MPa or more is preferably used.

If the oxide ion conductivity and the bending strength of the first solid electrolyte fall within the above-mentioned ranges, the single cell using this first solid electrolyte can possess sufficient generating performance and becomes excellent in reliability as a structure. In addition, as the first solid electrolyte is excellent in mechanical strength, if it is made thin-walled, oxide ion conductivity can be further improved. Therefore, low-temperature operation of the single cell is easy to achieve.

In the first solid electrolyte, the oxide ion conductivity at 800° C. of less than 0.015 S/cm is not preferable because the generating performance tends to decrease. On the other hand, the bending strength of less than 600 MPa is not preferable because the reliability of the single cell as a structure tends to be unmaintainable.

Incidentally, in the above description, the oxide ion conductivity relates to a value calculated according to Formula 2 below using a resistance value of a sample bar measured by the alternating current impedance method (frequency of 100 to 10 MHz, in static air), a length thereof, and a cross-sectional area thereof.

Oxide ion conductivity σ [S/cm]=(1/Resistance value R [Ω])×Length of Sample Bar L [cm]/Cross-Sectional Area of Sample Bar S [cm$^2$]     Formula 2:

It should be noted that for the sample bar, one with dimensions of 20 mm×3 mm×4 mm on which a platinum paste is sintered at 1000° C. as an electrode is used. A measurement temperature is 800° C.

On the other hand, the bending strength relates to a three-point bending strength which is measured according to JIS R1601 "Testing method for Bending Strength of Fine Ceramics". For the sample bar, one with dimensions of 40 mm×3 mm×4 mm is used. The measurement temperature is an ambient temperature of 20° C. to 30° C.

As for the first solid electrolyte satisfying the above-mentioned conditions of the oxide ion conductivity and the bending strength, ScSZ in which 3 to 6 mol %, preferably 4 to 6 mol % $Sc_2O_3$ is solubilized in $ZrO_2$ and a crystal phase is mainly structured by a tetragonal crystal; a dispersion strengthened solid electrolyte where a parent phase is ScSZ in which 3 to 6 mol %, preferably 4 to 6 mol % $Sc_2O_3$ is solubilized in $ZrO_2$, a trace amount of $Al_2O_3$ is dispersed therein, and a crystal phase is mainly structured by a tetragonal crystal; and the like are mentioned as suitable examples.

Here, in the above-mentioned ScSZ and dispersion strengthened solid electrolyte, if the $Sc_2O_3$ content falls within the range of 3 to 6 mol %, the oxide ion conductivity and mechanical characteristics such as strength and toughness become especially excellent.

The $Sc_2O_3$ content of less than 3 mol % is not preferable because a monoclinic crystal tends to be mixed in the crystal phase. Zirconia of the monoclinic crystal has low oxide ion conductivity and impedes ionic conduction, and internal resistance of the first solid electrolyte is increased. In contrast, the $Sc_2O_3$ content of more than 6 mol % is not preferable because a cubic crystal tends to be mixed in the crystal phase. Zirconia of the cubic crystal has high oxide ion conductivity but is inferior in the mechanical characteristics such as strength and toughness, thus lowering the reliability of the single cell as a structure.

Further, in the dispersion strengthened solid electrolyte, the $Al_2O_3$ content is 0.3 to 5 wt %, preferably 0.5 to 2 wt % based on ScSZ containing the above predetermined amount of $Sc_2O_3$. This is because the $Al_2O_3$ content in this range brings about an excellent balance between the oxide ion conductivity and the mechanical characteristics.

The $Al_2O_3$ content of less than 0.3 wt % is not preferable because an advantage of improving the mechanical characteristics such as strength and toughness tends to be hard to obtain. On the other hand, the $Al_2O_3$ content of more than 5 wt % is not preferable because the degree of reduction in the oxide ion conductivity becomes high, and practicality as an electrolyte tends to be low.

In addition, $Al_2O_3$ mentioned above preferably exists mainly in grain boundaries being bonding surfaces of ScSZ granules. In the case of the zirconia-based parent phase, since a pure zirconia single crystal exhibits the highest oxide ion conductivity, if $Al_2O_3$ substantially exists in the grain boundaries, the oxide ion conductivity of the ScSZ granule itself is not greatly impaired, and the mechanical characteristics such as strength and toughness are further improved.

Incidentally, if the above-mentioned ScSZ or dispersion strengthened solid electrolyte is used as the first solid electrolyte, the oxide ion conductivity at 800° C. falls within the range of about 0.015 to 0.055 S/cm and the bending strength falls within the range of about 600 to 1200 MPa.

[1.2 Fuel Electrode]

In the present invention, a cermet of a catalyst and a second solid electrolyte exhibiting high oxide ion conductivity is preferably used as the fuel electrode.

As for the catalyst constituting one part of the cermet, Ni, Co, Ru and the like are concretely mentioned as suitable examples, and one or more kinds of them may be mixed. Ni is preferably used because it is less expensive than the other metals, and its reactivity to a fuel gas such as hydrogen is fully high.

On the other hand, as for the second solid electrolyte constituting the other part of the cermet, a solid electrolyte of which oxide ion conductivity at 800° C. is 0.08 S/cm or more, preferably 0.10 S/cm or more is suitably used. If the second solid electrolyte with high oxide ion conductivity is used, more oxide ions are supplied to the triple phase boundary of the fuel electrode, and a cell reaction is stimulated.

Incidentally, the oxide ion conductivity of the second solid electrolyte is a value measured in the same way as that of the first solid electrolyte mentioned above.

As for the second solid electrolyte satisfying the above conditions, ScSZ containing 9 to 12 mol %, preferably 10 to 11 mol % of $Sc_2O_3$ is mentioned as a suitable example. In this case, the $Sc_2O_3$ content of less than 9 mol % or more than 12 mol % is not preferable because the oxide ion conductivity of the fuel electrode tends to lower to decrease electrode activity.

When ScSZ containing 9 to 12 mol % of $Sc_2O_3$ is used as the second solid electrolyte, ScSZ may further contain a trace amount of one or both of $Y_2O_3$ and $CeO_2$. In this case, the content of these oxides is more than 0 mol % and not more than 2 mol % and preferably falls within the range of 0.5 to 1 mol %. This is because the oxide ion conductivity of the fuel electrode is further improved and the electrode activity becomes especially excellent. In addition, preferably, a crystal phase of the second solid electrolyte-is mainly structured by a cubic crystal.

Besides, if ScSZ or ScSZ further containing $Y_2O_3$ and/or $Ceo_2$ as above is used as the second solid electrolyte, the oxide ion conductivity at 800° C. falls within the range of about 0.08 to 0.15 S/cm.

Further, the mixture ratio of the catalyst to the second solid electrolyte falls within the range of Catalyst:Second Solid Electrolyte=30 wt %:70 wt % to 70 wt %:30 wt %, preferably Catalyst:Second Solid Electrolyte=40 wt %:60 wt % to 60 wt %:40 wt %. The ratio out of these ranges is not preferable because the electric conductivity and the electrode activity are lowered so that the cell performance is lowered, or a coefficient of thermal expansion becomes so great that warpage occurs in the cells.

Incidentally, particle size constitution of the fuel electrode material may be adjusted according to surface roughness of the fuel electrode and will be described later.

[1.3 Air Electrode]

In the present invention, a compound of a first perovskite type oxide with a third solid electrolyte is suitable for the air electrode. If the air electrode is comprised of these materials, overvoltage of the air electrode (electrode resistance) is small even in the low-temperature region of the order of 600 to 900° C. Therefore, more oxide ions ionized at the air electrode are shifted from the air electrode to the first solid electrolyte to improve the cell reaction even in the low temperature region.

For the first perovskite type oxide constituting one part of the compound, perovskite type transition metal oxides such as $La_{1-x}Sr_xCo_{1-y}Fe_yO_3$ (wherein $0.2 \leq x \leq 0.6$, $0.6 \leq y \leq 0.9$) (hereinafter sometimes simply referred to as "LSCF"), $Pr_{1-x}Sr_xMnO_3$ (wherein $0.2 \leq x \leq 0.6$) (hereinafter sometimes simply referred to as "PSM") and $La_{1-x}Sr_xCoO_3$ (wherein $0.1 \leq x \leq 0.6$) (hereinafter sometimes simply referred to as "LSC") are mentioned as suitable examples. One or more kinds of them may be mixed.

Incidentally, in the present invention, in composition formulae of perovskite type oxides, the atomic ratio of oxygen is indicated as 3. As clearly understood by those skilled in the art, for example, if the atomic ratio x(y) is not 0, oxygen vacancies are generated. Therefore, in reality, the atomic ratio of oxygen is often smaller than 3. However, since the number of oxygen vacancies varies also according to the kind of an element added or a producing condition, the atomic ratio of oxygen is indicated as 3 for convenience.

On the other hand, for the third solid electrolyte constituting the other part of the compound, YSZ containing 8 to 10 mol %, preferably 8 to 9 mol % $Y_2O_3$; ScSZ containing 9 to 12 mol %, preferably 10 to 11 mol % $Sc_2O_3$; a ceria-based solid solution containing 10 to 35 mol %, preferably 15 to 30 mol %, more preferably 20 to 30 mol % of at least one oxide selected from $Gd_2O_3$, $Y_2O_3$, and $Sm_2O_3$ (hereinafter, the ceria-based solid solution containing $Gd_2O_3$ is sometimes referred to as "GDC", the solution containing $Y_2O_3$ as "YDC", and the solution containing $Sm_2O_3$ as "SDC"); and the like are mentioned as suitable examples, and one or more kinds of them may be mixed.

If YSZ is used as the third solid electrolyte, the $Y_2O_3$ content of less than 8 mol % is not preferable because the oxide ion conductivity tends to lower. On the other hand, the $Y_2O_3$ content of more than 10 mol % is not preferable because the oxide ion conductivity tends to lower.

Similarly, if ScSZ is used, the $Sc_2O_3$ content of less than 9 mol % is not preferable because long-term stability of the oxide ion conductivity tends to lower. On the other hand, the $Sc_2O_3$ content of more than 12 mol % is not preferable because the oxide ion conductivity tends to lower.

Similarly, if the ceria-based solid solution is used, the oxide content of less than 10 mol % is not preferable because the oxide ion conductivity tends to lower. On the other hand, the oxide content of more than 35 mol % is not preferable because a sintering property tends to deteriorate.

Here, it is preferable that the above-mentioned compound is concretely comprised of LSCF-SDC, LSCF-GDC, LSCF-YDC, PSM-SDC, PSM-GDC, PSM-YDC, LSC-SDC, LSC-GDC, LSC-YDC, and the like. This is because they have very small overvoltage of the air electrode (electrode resistance) and are especially excellent in the electrode activity even in the low-temperature region of the order of 600 to 900° C.

Further, the mixture ratio of the first perovskite type oxide to the third solid electrolyte may fall within the range of First Perovskite Type Oxide:Third Solid Electrolyte=90 wt %:10 wt % to 70 wt %:30 wt %, preferably First Perovskite Type Oxide:Third Solid Electrolyte=90 wt %:10 wt % to 80 wt %:20 wt %. The ratio out of these ranges is not preferable because the electrode activity tends to lower to increase deviation in the coefficient of thermal expansion.

Incidentally, particle size constitution of the air electrode material may be adjusted according to surface roughness of the air electrode and will be described later.

[1.4 Intermediate Layer]

In the present invention, the intermediate layer mainly has a function of suppressing the reaction between the first solid electrolyte material and the air electrode material. In order that this function is fully exerted, a fourth solid electrolyte exhibiting oxide ion conductivity and electric conductivity is preferably used as the intermediate layer.

For the fourth solid electrolyte, a ceria-based solid solution containing 10 to 35 mol %, preferably 15 to 30 mol %, more preferably 20 to 30 mol % of at least one oxide selected from $Gd_2O_3$, $Y_2O_3$ and $Sm_2O_3$, and the like are concretely mentioned as suitable examples.

The oxide content of the ceria-based solid solution of less than 10 mol % is not preferable because the oxide ion conductivity tends to lower. On the other hand, the oxide content of more than 35 mol % is not preferable because the sintering property tends to deteriorate.

[1.5 Fuel Electrode Contact Layer]

In the present invention, the fuel electrode contact layer mainly has functions of filling the interstices between the fuel electrode and a separator to improve the adhesion therebetween, thereby reducing contact resistance and improving current collecting efficiency. In order that these functions are fully exerted, a fuel electrode contact material containing at least a first metal powder is preferably used as the fuel electrode contact layer.

For the first metal powder, an Ni powder, an Ni alloy powder, a Pt powder, a Pt alloy powder, an Ag powder, an Ag alloy powder, an Au powder, an Au alloy powder, and the like are concretely mentioned as suitable examples. The Ni powder and the Ni alloy powder are preferably used. This is because they are comparatively less expensive; therefore, there are advantages that the object of the fuel electrode contact layer as above can be fully achieved while suppressing the production cost of the single cell.

In the above description, the Ni alloy powder relates to a powder of alloy comprised of Ni as a main component and one or more kinds of additional elements. For the additional elements, Fe, Ti, Pd, Ru, Pt and the like are concretely mentioned. Among them, Ru, Pd and the like are preferably used.

Incidentally, particle size constitution of the fuel electrode contact material may be adjusted according to surface roughness of the fuel electrode contact layer and will be described later.

[1.6 Air Electrode Contact Layer]

In the present invention, the air electrode contact layer mainly has functions of filling the interstices between the air electrode and a separator to improve the adhesion therebetween, thereby reducing contact resistance and improving current collecting efficiency. In order that these functions are fully exerted, an air electrode contact material containing at least a second metal powder and a second perovskite type oxide powder is preferably used as the air electrode contact layer.

For the second metal powder, the Ag powder or the Ag alloy powder, or a mixed powder prepared by mixing one or both of them with a noble metal powder or a noble metal alloy powder are concretely mentioned as suitable examples. The mixed powder is preferably used. This is because there are advantages that heat resistance of the air electrode contact layer is improved and exhaustion of the air electrode contact layer can be suppressed.

In the above description, the Ag alloy powder relates to a powder of alloy comprised of Ag as a main component and one or more kinds of additional elements. For the additional elements, Pd, Ru, Pt, Rh, Ir, Au, Cu, Zn, Ni, Cd, Sn and the like are concretely mentioned. Among them, Pd is preferably used because it is excellent in stability and heat resistance in an operating temperature region of the cells when comprised in an Ag alloy.

In addition, in the above description, the noble metal powder relates to a powder of noble metal other than Ag. For the noble metal in the noble metal powder, Pd, Ru, Pt, Rh, Ir, Au and the like are concretely mentioned. Among them, Pd is preferably used because stability of the Ag and/or Ag alloy powder in the operating temperature region of the cells can be improved. Further, the noble metal alloy powder relates to a powder of alloy comprised of the above noble metal as a main component and one or more kinds of additional elements.

When the mixed powder is used as the second metal powder, the content of the noble metal powder and the noble metal alloy powder is 1 to 15 wt %, preferably 1 to 5 wt % based on the Ag powder or the Ag alloy powder. The content of less than 1 wt % is not preferable because the stability of alloy tends to lower. In contrast, the content of more than 5 wt % is not preferable because material cost is increased and conductivity is decreased.

On the other hand, for the second perovskite type oxide powder, $La_{1-x}Sr_xCoO_3$ (wherein $0.1 \leq x \leq 0.6$) and the like are mentioned as suitable examples because the conductivity and stability of the air electrode contact layer become excellent.

Further, the mixture ratio of the second metal powder to the second perovskite type oxide powder falls within the range of Second Metal Powder:Second Perovskite Type Oxide Powder=90 wt %:10 wt % to 30 wt %:70 wt %, preferably Second Metal Powder:Second Perovskite Type Oxide Powder=70 wt %:30 wt % to 50 wt %:50 wt %.

A lower content of the second metal powder and a higher content of the second perovskite type oxide powder are not preferable because electric resistance of the air electrode contact layer to be obtained tends to increase and the current collecting efficiency tends to decrease. On the other hand, a higher content of the second metal powder and a lower content of the second perovskite type oxide powder are not preferable because a porous property of the air electrode contact layer is diminished, and the performance under air atmosphere is lowered and the single cell and the separator are firmly fixed to each other so that the single cell becomes apt to break due to the thermal expansion difference therebetween.

Incidentally, particle size constitution of the air electrode contact material may be adjusted according to surface roughness of the air electrode contact layer and will be described later.

Here, the above electrode contact materials are preferably in the form of slurry containing the various powders above and a binder. This is because the electrode contact materials in slurry form are excellent in a coating property when applied to the electrode surfaces. In addition, favorable adhesion condition is easily obtained between each electrode contact layer and the separator, and when the SOFC is heated at the time of the initial operation while keeping the favorable adhesion condition, microscopic asperities at the separator surface can be efficiently absorbed.

At this time, as for a solvent at the time of preparing slurry, any of an organic solvent and a water solvent may be used, and the organic solvent is preferably used.

When the organic solvent is used as the solvent, for the binder, polyethylene glycol, polyvinyl butyral, polyethylene, polymethyl methacrylate, thinner and the like are concretely mentioned. In addition, for regulating the viscosity of slurry and the like, a plasticizer such as dimethyl phthalate, dibutyl phthalate and butyl benzyl phthalate, or a dispersant such as fatty acid and benzene sulfonic acid may be mixed therein as required.

On the other hand, when the water solvent is used as the solvent, for the binder, polyvinyl alcohol, methylcellulose and the like are concretely mentioned. Likewise, as required, a plasticizer such as dibutyl phthalate, glycerine and ethyltoluenesulfonate, or a dispersant such as phosphoric acid glass and allyl sulfonic acid may be mixed therein.

Incidentally, the binder and the like other than the powders contained in the electrode contact materials disappear at the time of the initial heating of the single cell and the like.

[1.7 Surface Roughness of Outermost Cell Surface]

In the present invention, for each of the three-layered cell, the four-layered cell, the five-layered cell, and the six-layered cell, an outermost cell surface brought in contact with the separator preferably has surface roughness parameters within specified ranges.

In other words, in the three- and four-layered cells, the surface roughness of the fuel electrode may be such that maximum roughness depth Rmax falls within the range of 5 to 25 μm, preferably 5 to 20 μm, more preferably 6 to 20 μm, still more preferably 8 to 18 μm, and average roughness height Rz falls within the range of 3 to 20 μm, preferably 3 to 18 μm, more preferably 5 to 18 μm, still more preferably 6 to 15 μm.

The surface roughness of the air electrode may be such that the maximum roughness depth Rmax falls within the range of 3 to 20 μm, preferably 3 to 18 μm, more preferably 5 to 18 μm, still more preferably 6 to 18 μm, and the average roughness height Rz falls within the range of 2 to 18 μm, preferably 2 to 15 μm, more preferably 3 to 12 μm, still more preferably 4 to 12 μm.

The fuel electrode with surface roughness of less than 5 μm in Rmax and less than 3 μm in Rz and the air electrode with surface roughness of less than 3 μm in Rmax and less than 2 μm in Rz are not preferable because permeability of the electrodes is deteriorated and the generating performance tends to lower.

In addition, the fuel electrode with surface roughness of more than 25 μm in Rmax and more than 20 μm in Rz and the air electrode with surface roughness of more than 20 μm in Rmax and more than 18 μm in Rz are not preferable because adhesion to the separator is lowered, so that the contact resistance is increased to lower and current collecting effect, and the generating performance tends to lower.

On the other hand, in the five- and six-layered cells, the surface roughness of the fuel electrode contact layer may be such that the maximum roughness depth Rmax falls within the range of 5 to 25 μm, preferably 8 to 25 μm, more preferably 8 to 22 μm, still more preferably 10 to 22 μm, and the average roughness height Rz falls within the range of 3 to 22 μm, preferably 5 to 22 μm, more preferably 5 to 20 μm, still more preferably 6 to 20 μm.

In addition, the surface roughness of the air electrode contact layer may be such that the maximum roughness depth Rmax falls within the range of 3 to 24 μm, preferably 5 to 24 μm, more preferably 5 to 22 μm, still more preferably 8 to 20 μm, and the average roughness height Rz falls within the range of 2 to 20 μm, preferably 4 to 20 μm, more preferably 4 to 18 μm, still more preferably 8 to 18 μm.

The fuel electrode contact layer with surface roughness of less than 5 μm in Rmax and less than 3 μm in Rz and the air electrode contact layer with surface roughness of less than 3 μm in Rmax and less than 2 μm in Rz are not preferable because the permeability of the electrodes is deteriorated and the generating performance tends to lower.

Further, the fuel electrode contact layer with surface roughness of more than 25 μm in Rmax and more than 22 μm in Rz and the air electrode contact layer with surface roughness of more than 24 μm in Rmax and more than 20 μm in Rz are not preferable because adhesion to the separator is lowered, so that the contact resistance is increased to lower the current collecting effect, and the generating performance tends to lower.

Besides, in the five- and six-layered cells, the surface roughness of the electrodes is not specifically limited. This is because the five- and six-layered cells have the electrode contact layers; therefore, the electrode surfaces do not become the outermost cell surfaces, and the separators are not directly brought in contact with the electrode surfaces.

Here, in the present invention, the relation between the maximum roughness depth Rmax and the average roughness height Rz in each electrode surface and each electrode contact layer surface would also be an important factor in the surface roughness.

In other words, when the ratio of Rmax to Rz (an Rmax/Rz ratio, simply referred to as X hereinafter) at each electrode surface and each electrode contact layer surface falls within the range of more than 1 to not more than 2, i.e., when a relation is hold by Rmax=X·Rz (wherein 1<X≦2), the current collecting effect between the single cell and the separator is extremely high.

This is because, if Rmax/Rz=X falls within the above range, protrusions presented at the outer most cell surface are low in height, and the whole outermost cell surface is in a relatively plane asperity condition, so that adhesion to the separator becomes excellent.

Therefore, if a plurality of such single cells are stacked via separators to form the SOFC, the SOFC exhibits high generating performance.

Further, if the whole outermost cell surface is in the relatively plane asperity condition, when a plurality of single cells are stacked via separators, stress concentration on the protrusions is reduced, so that fractures and cracks are hard to occur in the single cells, thereby improving the reliability of the SOFC.

In the above description, Rmax/Rz=X preferably falls within the range of 1<X≦1.8, more preferably 1<X≦1.5, still more preferably 1<X≦1.3. X of more than 2 is not preferable because high protrusions are partially presented on the outermost cell surface, so that the asperities at the outermost cell surface become noticeable and the adhesion between the single cell and the separator is deteriorated to lower the generating performance. Moreover, it is not preferable because stress is concentrated on the protrusions when a plurality of single cells are stacked via separators, so that fractures and cracks are apt to occur in the single cells and the reliability of the SOFC tends to lower.

In addition, in the present invention, the average roughness height Rz relates to ten-point average roughness R'z as specified on DIN-4768. In DIN-4768, R'z is specified as an arithmetic mean value of the distances between two parallel lines that run along with the mean line and contact with a roughness profile at the peaks and/or the valleys, and the mean value is obtained within specified five individual measurement sections adjacent to each other. In addition, the maximum roughness depth Rmax relates to the maximum one of individual roughness depths generated within the total measurement section of 1 m as specified in DIN-4768.

More specifically, the surface roughness as mentioned in the present invention relates to measured values obtained in conformity with determination of R'max, R'z by means of electrical contact-type roughness parameters in Deutsche Industrie Normen (German Industrial Standard) "DIN-4768", as revised in May 1990. As a measurement device, a laser optical non-contact 3D shape measurement device capable of measuring the cell surface in a non-contact state is used.

Brief description will be given on the measurement principle of the laser optical non-contact 3D shape measurement device. That is, light from a semiconductor laser source passes through a movable objective lens to achieve focus of 1 μm diameter on a sample surface (which corresponds to the electrode surfaces in the three- and four-layered cells and the electrode contact layer surfaces in the five- and six-layered cells). At this time, regular reflection light goes back along the same optical path and forms images on four photo-diodes uniformly via a beam splitter.

Therefore, as for the sample surface to be measured with asperities, if inequality is generated in the images due to displacement, a signal to resolve this is immediately emitted, and the objective lens is controlled continuously to achieve focus at the surface of the sample. With the laser optical non-contact 3D shape measurement device, a travel amount at the time of control is detected by a light barrier measurement mechanism to enable highly precise measurement.

As the laser optical non-contact 3D shape measurement device applying such measurement principle, MICROFOCUS EXPERT "UBC-14 System" by UBM CORPORATION and the like are concretely mentioned.

Generally, the surface roughness is evaluated by a contact type surface roughness measurement device which makes a diamond probe and the like in contact with the surface of an object to be measured and converts a phase difference at the surface to an electric signal to measure the surface roughness.

However, a diameter of the probe is of the order of 2 μm at the minimum and is larger than the laser optical non-contact 3D shape measurement device. Moreover, as the probe is interfered by the asperities, the surface roughness of the outermost cell surface obtained by the contact type surface roughness measurement device is hard to appear as a great difference in the generating performance.

In contrast, the use of the laser optical non-contact 3D shape measurement device determines the surface shape or roughness more correctly than the contact type surface roughness measurement device. Therefore, the present invention employs the surface roughness measured by the laser optical non-contact 3D shape measurement device.

Further, when the surface roughness of the outermost cell surface thus obtained falls within the above ranges, the generating performance is improved as an electrode reaction field (a reaction effective area) is increased, and electricity generated per electrode area is enhanced. Further, the adhesion between the single cell and the separator is improved, thereby reducing the contact resistance and improving the current collecting efficiency to improve the generating performance of the SOFC.

[1.8 Surface Roughness of First Solid Electrolyte]

In the present invention, the surface of the first solid electrolyte preferably has surface roughness parameters within specified ranges.

In other words, the surface roughness of the first solid electrolyte may be such that the maximum roughness depth Rmax falls within the range of 3 to 15 μm, preferably 4 to 12 μm, more preferably 5 to 10 μm, and the average roughness height Rz falls within the range of 2 to 10 μm, preferably 3 to 9 μm, more preferably 4 to 8 μm.

This is because, if the surface roughness of the first solid electrolyte falls within the above ranges, the adhesion between the first solid electrolyte and each electrode in the boundary is improved, and reduction in the generating performance due to separation of them is hard to occur, resulting in the excellent generating performance and reliability of the single-cell.

The first solid electrolyte with surface roughness of less than 3 μm in Rmax and less than 2 μm in Rz is not preferable because the electrolyte surface is excessively plane so that when exposed in a high-temperature atmosphere for a long time or when repeatedly subjected to heat history between ambient temperature and high temperature during sintering after the electrode paste coating or during power generation, the electrodes tend to separate from the surface of the first solid electrolyte. Further, it is not preferable since an effective area of the triple phase boundary constituting the electrode reaction field is reduced, and the generating performance as a cell tends to decrease.

Further, the first solid electrolyte with surface roughness of more than 15 μm in Rmax and more than 10 μm in Rz is not preferable because the bending strength of the first solid electrolyte itself as a self-supporting film is lowered, and fractures are apt to generate at the time of handling and the like.

[1.9 Area Specific Resistance of Single Cell]

In the present invention, the single cell is preferably such that an area specific resistance (ASR) as its performance parameter falls within the range of 0.45 to 0.9 $\Omega cm^2$, preferably 0.45 to 0.8 $\Omega cm^2$. This is because, if ASR is small, the performance of the single cell is improved.

Here, the area specific resistance is a value calculated by the following Formula 1 when the current density is 0.5 $A/cm^2$ in a case where a power generating test is performed at 800° C. using a platinum mesh as a current collector and a separator of alumina while hydrogen is used as the fuel gas supplied to the fuel electrode of the single cell and air is used as an oxidant gas supplied to the air electrode.

Area Specific Resistance [$\Omega cm^2$]=(Open Circuit Voltage [V]−Output Voltage [V])/Current Density [$A/cm^2$]     Formula 1:

It should be noted that the open circuit voltage is a value determined uniquely by a kind of gas. Further, the output voltage is a value of voltage when the current density I0=0.5 $A/cm^2$.

The single cell with the area specific resistance of more than 0.9 $\Omega cm^2$ is not preferable because the single cell performance is lowered and practically sufficient performance is hard to obtain.

[2. Production Method of Single Cell]

Next, the description will be given on one example of production method of the single cell consistent with the present invention provided with the above-mentioned constitution. It should be noted that the production method is not limited to the following description.

Initially, the explanation is given on a case where the three- and four-layered cells are produced. First, the first solid electrolyte material being a material for the first solid electrolyte is prepared. If the dispersion strengthened solid electrolyte is used as the first solid electrolyte, for example, the ScSZ powder containing a predetermined amount of $Sc_2O_3$ and the $Al_2O_3$ powder are mixed to have a predetermined composition, and the mixture is wet-blended by using a ball mill and the like. Then, the mixture is dried out to obtain the dispersion strengthened solid electrolyte material.

At this time, for the $Al_2O_3$ powder, $\alpha$-$Al_2O_3$, $\gamma$-$Al_2O_3$ and the like may be employed. In view of uniformly dispersing $Al_2O_3$ in the grain boundaries after the sintering, $\gamma$-$Al_2O_3$ is preferably used. Since particles of $\gamma$-$Al_2O_3$ are fine, they are easy to grind in the mixing process, and uniformly dispersed in the grain boundaries without inhibiting grain growth in the parent phase at the time of sintering. In addition, if $\gamma$-$Al_2O_3$ is used, in comparison with the case of using $\alpha$-$Al_2O_3$, there are advantages that a desired strength improvement can be achieved in a less amount, and the reduction in the oxide ion conductivity may be suppressed at lower level.

Next, the above first solid electrolyte material is used to mold a planar electrolyte green sheet, and then the electrolyte green sheet is sintered at a predetermined temperature to prepare an electrolyte sheet as the first solid electrolyte. As for the molding method of the electrolyte green sheet, the doctor blade method of pouring slurry containing the first solid electrolyte material onto a high-polymer film and stretching the slurry lightly with a doctor blade, or another methods may be preferably employed.

Here, the electrolyte sheet with Rmax and Rz in the above specified ranges can be obtained by, for example, providing surface coarsening to the sintered electrolyte sheet using sandblast and the like. In addition, for example, in the doctor blade method mentioned above, if a high-polymer film which is previously subjected to surface coarsening to have the surface roughness within predetermined ranges is used, the electrolyte sheet with Rmax and Rz in the above-specified ranges can be efficiently obtained.

In this case, for the high-polymer film, those prepared by forming polymers such as polyethylene terephthalate, polyethylene and polyimide into a film shape are mentioned as suitable examples.

In addition, the surface roughness of the high-polymer film may be such that the maximum roughness depth Rmax falls within the range of 3 to 8 μm, preferably 3 to 7 μm, more preferably 4 to 7 μm, and the average roughness height Rz falls within the range of 2 to 7 μm, preferably 2 to 6 μm, more preferably 3 to 6 μm.

The high-polymer film with surface roughness of less than 3 μm in Rmax and less than 2 μm in Rz is not preferable because the electrolyte sheet with Rmax and Rz in the above-specified ranges tends to be hard to obtain.

In addition, the high-polymer film with surface roughness of more than 8 μm in Rmax and more than 7 μm in Rz is not preferable because the coated electrolyte green sheet tends to be hard to separate from the high-polymer film, thereby impeding workability.

For a sintering condition for the obtained electrolyte green sheet, an optimum temperature may be selected in accordance with its composition, a crystal phase after the sintering, and the like. For example, if the electrolyte green sheet molded from the above-mentioned dispersion strengthened solid electrolyte material is sintered, the sintering is performed within the temperature range of 1300 to 1400° C., preferably 1350 to 1400° C. The sintering temperature of less than 1300° C. is not preferable because the oxide ion conductivity of the electrolyte sheet to be obtained tends to be decreased. In contrast, the sintering temperature of more than 1400° C. is not preferable because desired mechanical characteristics tend to be not obtained as the crystal particles become coarse.

In this case, the thickness of the electrolyte sheet may fall within the range of 50 to 300 μm, preferably 100 to 200 μm. The thickness of less than 50 μm is not preferable because the reliability of the SOFC and the single cell as a structure tends to decrease. On the other hand, the thickness of more than 300 μm is not preferable because the internal resistance is increased and the oxide ion conductivity tends to be decreased.

Next, the catalyst material and the second solid electrolyte material are weighed in a predetermined amount to have a predetermined weight ratio, and they are mixed and then dispersed in a binder to prepare slurry. Then, this fuel electrode material is painted on one side of the first solid electrolyte. Then, this is sintered at an optimum temperature according to the kind of the fuel electrode material to bond the fuel electrode to the first solid electrolyte. For example, in the case of the above-mentioned fuel electrode material, the sintering temperature may fall within the range of 1300 to 1400° C., preferably 1325 to 1375° C. At this time, the thickness of the fuel electrode may fall within the range of 10 to 50 μm, preferably 20 to 30 μm.

Here, when the four-layered cell is produced, the fourth solid electrolyte material as a material of the intermediate layer is prepared, and then the intermediate layer is bonded to the first solid electrolyte. In detail, when the above-mentioned ceria-based solid solution is used as the fourth solid electrolyte, for example, at least one oxide powder selected from $Gd_2O_3$, $Y_2O_3$ and $Sm_2O_3$ and a $CeO_2$ powder being a main material are mixed to obtain a predetermined composition and are wet-blended with a ball mill and the like, and then dried to prepare the mixed powder.

In this case, if a liquid phase production process such as the sol-gel method and the coprecipitation method is adopted as the method for obtaining the mixed powder, a uniform mixed powder with few impurities can be obtained.

Then, if the mixed powder is calcinated within the temperature range of 600 to 1000° C. and then ground by a bead mill and the like and classified, a material powder of the ceria-based solid solution in which at least one oxide selected from $Gd_2O_3$, $Y_2O_3$ and $Sm_2O_3$ is solubilized in a predetermined amount can be prepared.

Next, the fourth solid electrolyte material is weighed in a predetermined amount and is dispersed in a binder to prepare slurry. This intermediate layer material is painted on the other side of the first solid electrolyte. Then, this is sintered at an optimum temperature according to the kind of intermediate layer material to bond the intermediate layer to the first solid electrolyte. For example, the above-mentioned intermediate layer material may be sintered within the temperature range of 1300 to 1400° C., preferably 1325 to 1375° C. At this time, the thickness of the intermediate layer may fall within the range of 8 to 50 µm, preferably 10 to 30 µm.

Next, the first perovskite type oxide material and the third solid electrolyte material are weighed in a predetermined amount to have a predetermined weight ratio, and they are mixed and then dispersed in a binder to prepare slurry. Then, this air electrode material is painted on the other side of the first solid electrolyte or on the surface of the intermediate layer. Then, this is sintered at an optimum temperature according to the kind of the air electrode material to bond the air electrode to the first solid electrolyte or the intermediate layer. For example, the above-mentioned air electrode material may be sintered within the temperature range of 800 to 1200° C., preferably 850 to 1150° C. At this time, the thickness of-the air electrode may fall within the range of 10 to 50 µm, preferably 20 to 30 µm. Besides, when the ceria-based solid solution is used as the third solid electrolyte material, it may be prepared in the same way as mentioned above.

In preparing the fuel electrode, the intermediate layer, and the air electrode mentioned above, the screen printing method, the doctor blade method, the brushing method, the spray method, and the like are concretely mentioned as suitable examples for the painting method of the fuel electrode material, the intermediate layer material, and the air electrode material.

According to the above procedure, the three- and four-layered cells can be prepared. Further, on the occasion of producing the five- and six-layered cells, the following procedure may be performed in addition to the above procedure. The explanation thereon will be given below.

On the fuel electrode surfaces of the three- and four-layered cells obtained as above, the fuel electrode contact material containing at least the first metal powder is painted to form the fuel electrode contact layer. At this time, the thickness of the fuel electrode contact layer may fall within the range of 10 to 50 µm, preferably 20 to 30 µm.

Next, the second metal powder and the second perovskite type oxide powder are weighed in a predetermined amount to have a predetermined weight ratio, and they are mixed to prepare a mixed powder. Then, this air electrode contact material containing at least the above mixed powder is painted on the air electrode surface of the three- and four-layered cells to form the air electrode contact layer. At this time, the thickness of the air electrode contact layer may fall within the range of 10 to 50 µm, preferably 20 to 30 µm.

In preparing the electrode contact layers, a variety of methods such as the screen printing method, the brushing method, the spray method and the doctor blade method, and a method of coating the electrode surfaces with sprinkling the electrode contact materials are mentioned as suitable examples for the painting method of the electrode contact materials, and may be appropriately selected in consideration of a property of the electrode contact materials (e.g., slurry form, powder form).

Incidentally, if the slurry in which various powders are dispersed in a binder is used as the electrode contact materials, it is preferable to previously paint the same binder as the binder in the slurry on the electrode surfaces by the brushing method, the spray method, or the like, and form the electrode contact layers thereafter. This is because, owing to such pretreatment, the slurry is absorbed in the vacancies of the electrodes being a porous body, and uniform electrode contact layers are easily formed on the electrodes.

In this way, the five- and six-layered cells can be produced.

Here, in each cell above, in order to adjust the surface roughness Rmax and Rz of the electrodes and the electrode contact layers to fall within the above specified ranges, the electrode materials and the electrode contact layer materials of which particle size constitution is adjusted in the following way may be used.

That is, it is preferable to use the fuel electrode material of which particle size constitution is adjusted based on its solid content such that a 50% by volume diameter falls within the range of 0.3 to 9 µm and a 90% by volume diameter falls within the range of 1.8 to 24 µm, preferably the 50% by volume diameter falls within the range of 0.5 to 6 µm and the 90% by volume diameter falls within the range of 3 to 18 µm, more preferably the 50% by volume diameter falls within the range of 0.5 to 4 µm and the 90% by volume diameter falls within the range of 3 to 9 µm.

Further, it is preferable to use the air electrode material of which particle size constitution is adjusted based on its solid content such that the 50% by volume diameter falls within the range of 0.5 to 15 µm and the 90% by volume diameter falls within the range of 2 to 20 µm, preferably the 50% by volume diameter falls within the range of 0.8 to 8 µm and the 90% by volume diameter falls within the range of 3 to 15 µm, more preferably the 50% by volume diameter falls within the range of 0.8 to 4 µm and the 90% by volume diameter falls within the range of 3 to 9 µm.

Still further, it is preferable to use the fuel electrode contact material of which particle size constitution is adjusted based on its solid content such that the 50% by volume diameter falls within the range of 0.5 to 15 µm and the 90% by volume diameter falls within the range of 2 to 20 µm, preferably the 50% by volume diameter falls within the range of 0.8 to 10 µm and the 90% by volume diameter falls within the range of 3 to 15 µm, more preferably the 50% by volume diameter falls within the range of 0.8 to 8 µm and the 90% by volume diameter falls within the range of 3 to 12 µm.

Still further, it is preferable to use the air electrode contact material of which particle size constitution of its solid content is adjusted such that the 50% by volume diameter falls within the range of 0.3 to 12 µm and the 90% by volume diameter falls within the range of 1.5 to 18 µm, preferably the 50% by volume diameter falls within the range of 0.3 to 9 μm and the 90% by volume diameter falls within the range of 1.5 to 15 μm, more preferably the 50% by volume diameter falls within the range of 0.5 to 6 μm and the 90% by volume diameter falls within the range of 2 to 12 μm.

It is not preferable that the particle size constitution of the solid content in the electrode materials and the electrode contact layer materials is greater than the 50% by volume diameter and the 90% by volume diameter mentioned above. This is because Rmax and Rz of the electrode surfaces and the electrode contact layer surfaces exceed the above-specified ranges, and the adhesion between the single cell and the separator tends to deteriorate to decrease the generating performance. On the other hand, it is not preferable that the particle size constitution is smaller than the 50% by volume diameter and the 90% by volume diameter mentioned above. This is because Rmax and Rz of the electrode surfaces and the electrode contact layer surfaces fall below the above-specified ranges, and the permeability of the electrodes in the single cell tends to deteriorate to decrease the generating performance.

Incidentally, the particle size constitution of the solid content in the electrode materials and the electrode contact layer materials relates to measured values obtained by using a laser diffraction type particle size distribution measurement device (e.g. "SALD-1100" by SHIMADZU CORPORATION) and the measurement is made by diluting the respective materials with a solvent such as ethanol and providing ultrasonic treatment, and then dispersing the solid content in the materials.

Here, the 50% by volume diameter indicates a particle size at 50% by volume in a cumulative volume distribution curve with respect to particle sizes which is made from the smaller particle size. Similarly, the 90% by volume diameter indicates a particle size at 90% by volume therein.

[3. Quality Testing Method for Single Cell]

Next, the explanation will be given on a quality testing method for the single cell consistent with the present invention produced as mentioned above.

In the present invention, the outermost cell surfaces of the single cell are preferably in a flat shape from a macroscopic viewpoint.

When a plurality of the single cells produced as mentioned above are stacked and used as the SOFC, not only a surface shape from a microscopic viewpoint such as the surface roughness but also a surface shape from a macroscopic viewpoint have great effect on the generating performance.

For example, there are some cases where protrusions are generated at the outermost cell surfaces of the single cell because of lumps of slurry generated while screen-printing slurry of the electrode materials, the electrode contact materials and the like, thin spots and prominences on the printed slurry, foreign substances adhered to the electrode surfaces and the electrode contact layer surfaces at the time of sintering the slurry, blister, and the like.

If such protrusions exist at the outermost cell surface, flatness of the single cell is impaired, so that the adhesion between the outermost cell surface and the separator is deteriorated to lower the generating performance of the SOFC. Therefore, after the production of the single cell, flatness of the single cell is preferably tested and identified.

For example, in the case of the SOFC generating 1 kW per unit, if an effective electrode area of the single cell is 100 cm², about twenty to sixty single cells should be stacked. In this case, between the single cells of the SOFC, separators far heavier than the single cells should be interposed; therefore, the single cell positioned at the lowest part of the SOFC bears a load of the order of about 20 to 60 kg. Accordingly, if there are protrusions and warpage as mentioned above in the single cell, the load concentrates thereon and fractures and cracks are apt to occur.

In this way, the flatness of the single cell is an important factor even for assembly of the SOFC in addition to the generating performance of the SOFC. Therefore, previous determination thereof has a great significance in quality control of the single cell, moreover, reliability of the SOFC using the single cells.

Consequently, in the present invention, the flatness of the single cell is tested and identified by a specific load test. That is, in the present invention, the load test is conducted on the obtained single cell, and visual observations are made thereon. The single cell in which fractures and cracks are not substantially identified passes the load test, and thus the flatness of the single cell is judged. Therefore, by preparing the SOFC using only the single cells which have passed the load test, the SOFC of high reliability can be obtained.

Here, the above-mentioned load test relates to a test in which the single cell is sandwiched between dense plates which are larger than the surface area of the single cell and have a smooth surface, and loads are imposed at a fixed velocity all over the single cell surface, and then loads are relieved.

For the dense plate, a glass plate is used. Size and shape thereof can be appropriately selected according to size and shape of the single cell, and basically, the next larger size plate than the single cell in the same shape as the single cell is used.

For example, when the single cell is circular and 120 mm in diameter, the dense plate to use may be circular and about 130 to 150 mm in diameter. Further, for example, when the single cell is a square of which side is 100 mm, the dense plate to use may be a square of which side is about 110 to 130 mm. Besides, the thickness of the dense plate falls within the range of 2 to 10 mm, and surface finish is more than ▽▽▽. It should be noted that these symbols are specified in JIS B0031 "Indication of surface texture in technical product documentation" established in 1982, Appendix Table I "Standard sequence of surface roughness of finish symbols". The symbols ▽▽▽ correspond to Ra=1.6a, Rmax=25S, Rz=6.3Z.

Further, as for a load testing device, a material test and evaluation device capable of imposing loads at a fixed velocity is used. At this time, the crosshead speed of the load testing device is 0.5 mm/min for uniformly imposing loads all over the single cell surface. The imposed loads are 0.2 kgf/cm². If the imposed loads are excessively great, the permeability and porosity of the electrodes of the single cell are sometimes impaired, and there are some cases where the generating performance of the SOFC is contrarily lowered.

Power generation is enabled by attaching fuel gas supplying means, oxidant gas supplying means and the like respectively to the single cell obtained as mentioned above.

[4. SOFC using Single Cells]

If a plurality of the single cells as above are stacked via the separator, the SOFC can obtained, and if the fuel gas supplying means, the oxidant gas supplying means and the like are attached thereto, power generation can be performed.

At this time, for a separator material, lanthanum-chromium based oxides such as $LaCrO_3$, or metal/alloy based materials such as alumina and ferritic stainless are mentioned as suitable examples. Among them, the separator of ferritic stainless is preferably used because there are advantages of low-cost production and high design flexibility of a gas flow path.

The SOFC thus obtained employs the single cells excellent in the generating performance in the low-temperature region of the order of 600 to 900° C. and the reliability. In addition, an interaction between the outermost cell surfaces of the single cell and the separators through their contact is fully considered. Therefore, this SOFC is also excellent in the generating performance at low temperatures and the reliability.

EXAMPLE

[Oxide Ion Conductivity and Mechanical Characteristics of First Solid Electrolyte, and its Crystal Phase]

Initially, measurement of the oxide ion conductivity and the mechanical characteristics of the first solid electrolyte, and its crystal phase was performed.

First, for the first solid electrolyte material, ScSZ containing 3, 3.5, 4, 5, 6 mol % $Sc_2O_3$ (respectively referred to as "3ScSZ", "3.5ScSZ", "4ScSZ", "5ScSZ", "6ScSZ", hereinafter) materials were prepared. Then, in order that 0.5 wt % $Al_2O_3$ would be contained based on 4ScSZ, a 4ScSZ material and an $Al_2O_3$ powder were weighed, respectively, and ethyl alcohol was added thereto, and then the mixture was wet-blended with a ball mill (by using a $ZrO_2$ cobble). The liquid mixture was then heated and dried while being stirred to obtain a dispersion strengthened solid electrolyte material (referred to as "4ScSZ0.5A" hereinafter).

Next, the 3ScSZ to 6ScSZ materials and the 4ScSZ0.5A material were molded by uniaxial die-pressing at the molding pressure of 1000 kgf/cm$^2$. Then, the molded bodies were sintered for 2 hours at the sintering temperature of 1400° C. to prepare 3ScSZ to 6ScSZ sintered bodies and a 4ScSZ0.5A sintered body. Additionally, an ScSZ containing 7 mol % $Sc_2O_3$ (referred to as "7ScSZ" hereinafter) material was prepared to prepare a comparative 7ScSZ sintered body following the same procedure.

Incidentally, the respective ScSZ materials produced by DAIICHI KIGENSO KAGAKU KOGYO CO., LTD., and the $Al_2O_3$ powder produced by TAIMEI CHEMICALS CO., LTD. were used.

Next, the respective sintered bodies were measured for the oxide ion conductivity at 800° C. (by the alternating current impedance method) and for the three-point bending strength at ambient temperature (in conformity with JIS R1601). In addition, XRD patterns of the 4ScSZ sintered body and the 4ScSZ0.5A sintered body were obtained to measure their crystal phases.

Figure 2:
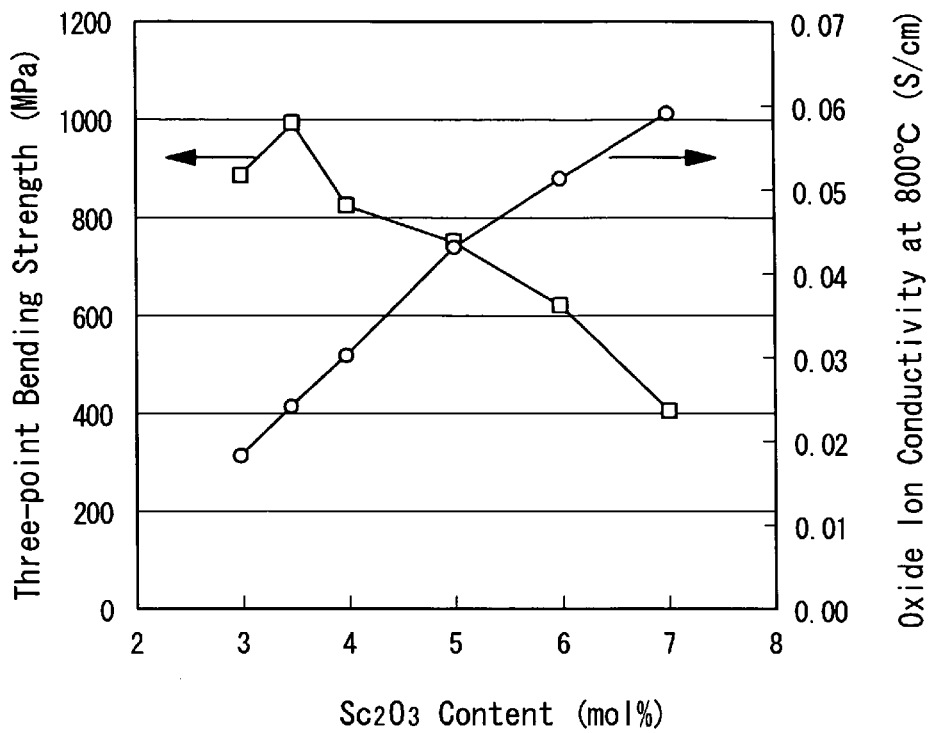
FIG. 2 is a graph showing the relationship of the $Sc_2O_3$ content (mol %) of ScSZ with a three-point bending strength (MPa) at ambient temperature and oxide ion conductivity (S/cm) at 800° C.

FIG. 2 shows the relationship of the $Sc_2O_3$ content (mol %) of ScSZ with the three-point bending strength (MPa) at ambient temperature and the oxide ion conductivity (S/cm) at 800° C.

As is evident from FIG. 2, as the $Sc_2O_3$ content was increased, the oxide ion conductivity at 800° C. was increased while the three-point bending strength at ambient temperatures was decreased. In addition, in the 3ScSZ to 6ScSZ sintered bodies, the oxide ion conductivity at 800° C. fell within the range of about 0.015 to 0.055 S/cm, and the three-point bending strength at ambient temperature fell within the range of about 600 to 1000 MPa. On the other hand, in the 4ScSZ0.5A sintered body, the oxide ion conductivity at 800° C. was 0.03 S/cm, and the three-point bending strength at ambient temperature was 1000 MPa.

Besides, both the crystal phases of the 4ScSZ and 4ScSZ0.5A sintered bodies were the tetragonal crystal.

These results show that the 3ScSZ to 6ScSZ sintered bodies are excellent in the oxide ion conductivity and the mechanical characteristics. Among others, the 4ScSZ0.5A sintered body is especially excellent in the mechanical characteristics and very advantageous for securing the reliability of the single cell.

Contrarily, in the comparative 7ScSZ sintered body, while the oxide ion conductivity at 800° C. was as high as 0.06 S/cm, the three-point bending strength at ambient temperature was only 400 MPa. Therefore, the 7ScSZ sintered body was not excellent in the oxide ion conductivity and the mechanical characteristics.

[Oxide Ion Conductivity of Second Solid Electrolyte, and its Crystal Phase]

Next, the oxide ion conductivity of the second solid electrolyte and its crystal phase were measured.

First, for the second solid electrolyte constituting one part of the fuel electrode, an ScSZ containing 11 mol % $Sc_2O_3$ (referred to as "11ScSZ" hereinafter) material, an ScSZ containing 10 mol % $Sc_2O_3$ and 1 mol % $CeO_2$ (referred to as "10Sc1CeSZ" hereinafter) material, and an ScSZ containing 10 mol % $Sc_2O_3$ and 1 mol % $Y_2O_3$ (referred to as "10Sc1YSZ" hereinafter) material were prepared.

Next, in the same way as mentioned above, an 11ScSZ sintered body, a 10Sc1CeSZ sintered body, and a 10Sc1YSZ sintered body were prepared. Then, the sintered bodies were measured for the oxide ion conductivity at 800° C. and their crystal phases. Besides, a comparative 8YSZ sintered body was used.

Incidentally, as for the 11ScSZ, 10Sc1CeSZ and 10Sc1YSZ materials, those produced by DAIICHI KIGENSO KAGAKU KOGYO CO., LTD. were used. For the 8YSZ material, that produced by TOSOH CORPORATION was used.

Table 1 provides the oxide ion conductivity at 800° C. of each sintered body, and its crystal phase.

TABLE 1

| Composition | Oxide Ion Conductivity (S/cm) 800° C. | Crystal Phase |
|---|---|---|
| 11 mol % $Sc_2O_3$—89 mol % $ZrO_2$ (11ScSZ) | 0.09 | Cubic Crystal |
| 10 mol % $Sc_2O_3$—1 mol % $CeO_2$—89 mol % $ZrO_2$ (10Sc1CeSZ) | 0.12 | Cubic Crystal |
| 10 mol % $Sc_2O_3$—1 mol % $Y_2O_3$—89 mol % $ZrO_2$ (10Sc1YSZ) | 0.11 | Cubic Crystal |
| 8 mol % $Y_2O_3$—92 mol % $ZrO_2$ (8YSZ) | 0.045 | Cubic Crystal |

According to Table 1, in the case of the 11ScSZ, 10Sc1CeSZ and 10Sc1YSZ sintered bodies, the oxide ion conductivity at 800° C. was 0.08 S/cm or more, demonstrating high oxide conductivity. Further, the crystal phase of every sintered body was the cubic crystal.

To the contrary, in the 8YSZ sintered body, the oxide ion conductivity at 800° C. was 0.045 S/cm, not satisfying the condition as the second solid electrolyte in the present application.

[Evaluation of Electrode Activity of Air Electrode at 800° C.]

Next, for quantitatively evaluating the electrode activity of the air electrode at 800° C., compact cells were prepared and measured for the overvoltage of the air electrode (electrode resistance) by the alternating current impedance method.

Precisely, on one side of a solid electrolyte plate comprised of 4ScSZ0.5A (2 cm per side, 100 μm in thickness), a fuel electrode comprised of Ni-10Sc1CeSZ (5 mm in diameter, 20 μm in thickness, 0.2 cm$^2$ of electrode area) was bonded, and on the other side of the solid electrolyte plate, an air electrode comprised of various compounds (5 mm in diameter, 20 μm in thickness, 0.2 cm$^2$ of electrode area) was bonded to prepare each compact cell. At this time, at the end of the electrolyte facing the air electrode, a platinum reference electrode was provided.

Incidentally, for preparing the above compounds, the first perovskite type oxide and the third solid electrolyte were weighed at the weight ratio of First Perovskite Type Oxide: Third Solid Electrolyte=8:2, mixed for 24 hours using the ball mill, and dried. Then, slurry was made by adding a binder (polyethylene glycol) to each compound and was painted on the solid electrolyte plate by the screen printing method. Subsequently, the slurry was sintered for 2 hours at 850 to 1150° C. to make each air electrode.

Here, for the compounds, a compound of $La_{0.6}Sr_{0.4}Co_{0.2}Fe_{0.8}O_3$ (referred to as "$L_{0.6}S_{0.4}C_{0.2}F_{0.8}$" hereinafter) and $CeO_2$ containing 30 mol % $Sm_2O_3$ (referred to as "30SDC" hereinafter) (this compound is referred to as "$L_{0.6}S_{0.4}C_{0.2}F_{0.8}$-30SDC" hereinafter), a compound of $L_{0.6}S_{0.4}C_{0.2}F_{0.8}$ and 8YSZ (this compound is referred to as "$L_{0.6}S_{0.4}C_{0.2}F_{0.8}$-8YSZ" hereinafter), a compound of $Pr_{0.6}Sr_{0.4}MnO_3$ (referred to as "$P_{0.6}S_{0.4}M$" hereinafter) and 30SDC (this-compound is referred to as "$P_{0.6}S_{0.4}M$-30SDC" hereinafter), and a compound of $Pr_{0.6}Sr_{0.4}MnO_3$ and 8YSZ (this compound is referred to as "$P_{0.6}S_{0.4}M$-8YSZ" hereinafter) were used.

In addition, a reference compound of $La_{0.8}Sr_{0.2}MnO_3$ (referred to as "$L_{0.8}S_{0.2}M$" hereinafter) and 8YSZ (this compound is referred to as "$L_{0.8}S_{0.2}M$-8YSZ" hereinafter) was used.

Incidentally, as for $L_{0.6}S_{0.4}C_{0.2}F_{0.8}$, $P_{0.6}S_{0.4}M$ and $L_{0.8}S_{0.2}M$, those produced by SEIMI CHEMICAL CO., LTD. were used. Further, 30SDC produced by DAIICHI KIGENSO KAGAKU KOGYO CO., LTD. and 8YSZ produced by TOSOH CORPORATION were used.

Thus obtained compact cells 1 to 4 and the reference compact cell were supplied with hydrogen as the fuel gas and air as the oxidant gas, and the power generating test was conducted thereon by collecting current with platinum meshes (at the test temperature of 800° C.). The results are shown in FIG. 3.

Figure 3:
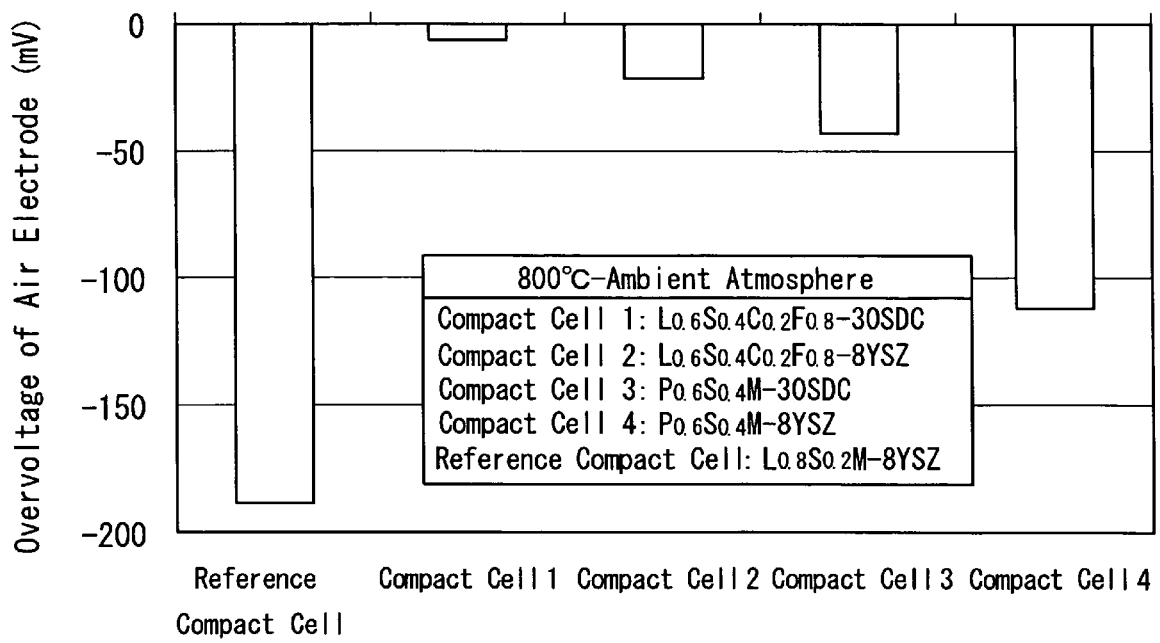
FIG. 3 is a graph showing overvoltage of an air electrode (electrode resistance) in each compact cell.

FIG. 3 shows overvoltage of the air electrode (electrode resistance) in each compact cell. According to FIG. 3, the compact cells 1 to 4 using $L_{0.6}S_{0.4}C_{0.2}F_{0.8}$-30SDC, $L_{0.6}S_{0.4}C_{0.2}F0.8$-8YSZ, $P_{0.6}S_{0.4}M$-30SDC and $P_{0.6}S_{0.4}M$-8YSZ as the compounds had lower overvoltage of the air electrode (electrode resistance) even at a low temperature of 800° C. and were more excellent in the electrode activity than the reference compact cell using $L_{0.8}S_{0.2}M$-8YSZ as the compound.

Further, the compact cells 1 and 3 using SDC as the third solid electrolyte had lower overvoltage of the air electrode (electrode resistance) than the compact cells 2 and 4 using YSZ as the third solid electrolyte. Therefore, the electrode activity in the low-temperature region was made excellent by using not stabilized zirconia but the ceria-based solid solution as the third solid electrolyte.

[Preparation of Air Electrode Contact Material and Conductivity Measurement]

(Preparation of Air Electrode Contact Material No. 1)

Next, four kinds of air electrode contact materials were prepared according to the following procedure.

In detail, first, the Ag powder and the Pd powder were prepared as the second metal powder. Further, an $La_{0.6}Sr_{0.4}CoO_3$ (referred to as "$L_{0.6}S_{0.4}C$" hereinafter) powder was prepared as the second perovskite type oxide powder. Then, each powder was weighed in a predetermined amount to have the weight ratio of Ag Powder:Pd Powder=98 wt %:2 wt %. Subsequently, each powder was weighed in a predetermined amount to have the weight ratio of Mixed Ag—Pd Powder:$L_{0.6}S_{0.4}C$ Powder=20 wt %:80 wt %.

Next, a binder (diethylene glycol mono butyl ether acetate, n-paraffin, turpentine, cellulosic resin) was added to the above mixed powder in the predetermined amount and kneaded for 2 hours, and then the $L_{0.6}S_{0.4}C$ powder and 2-propanol were further added thereto and kneaded for 2 hours to prepare an air electrode contact material No. 1 in slurry form.

(Preparation of Air Electrode Contact Material No. 2)

An air electrode contact material No. 2 was prepared following the same procedure as the material No. 1 except for the mixed ratio of Mixed Ag—Pd Powder:$L_{0.6}S_{0.4}C$ Powder=40 wt %:60 wt %.

(Preparation of Air Electrode Contact Material No. 3)

An air electrode contact material No. 3 was prepared following the same procedure as the material No. 1 except for the mixed ratio of Mixed Ag—Pd Powder:$L_{0.6}S_{0.4}C$ Powder=50 wt %:50 wt %.

(Preparation of Air Electrode Contact Material No. 4)

An air electrode contact material No. 4 was prepared following the same procedure as the material No. 1 except for the mixed ratio of Mixed Ag—Pd Powder:$L_{0.6}S_{0.4}C$ Powder=70 wt %:30 wt %.

(Preparation of Comparative Air Electrode Contact Material)

Only the $L_{0.6}S_{0.4}C$ powder was dissolved in polyethylene glycol to prepare a comparative air electrode contact material in slurry form.

Incidentally, in the above description, the Ag powder produced by SHOEI CHEMICAL INC. (Trade name "Ag-128", 2.2 μm in 50% by volume diameter), the Pd powder of SHOEI CHEMICAL INC. (Trade name "Pd-215", 0.7 μm 50% by volume diameter), the $L_{0.6}S_{0.4}C$ powder produced by SEIMI CHEMICAL CO., LTD. (1.1 μm in 50% by volume diameter) were used.

(Conductivity Measurement on Each Air Electrode Contact Material)

Next, conductivity measurement was made on the air electrode contact materials Nos. 1 to 4 and the comparative air electrode contact material prepared as above.

In detail, a platinum paste was painted on the both ends of sample bars made of alumina (about 4.6 mm×3.6 mm×25 mm in dimensions) and then dried, and a platinum lead wire was wound on each sample bar. Then, on one surface of the alumina sample bar, each air electrode contact material mentioned above was painted lightly and dried, and each alumina sample bar was connected to an alternating current impedance measurement device and measured for electric resistance (Ω) by the 2 probes method. At this time, the measurement temperature and the heat history was based on six-point measurement in the sequence of 650° C., 700° C., 750° C., 800° C., 850° C., 900° C. Then, the conductivity was measured by the following Formula 3.

Figure 4:
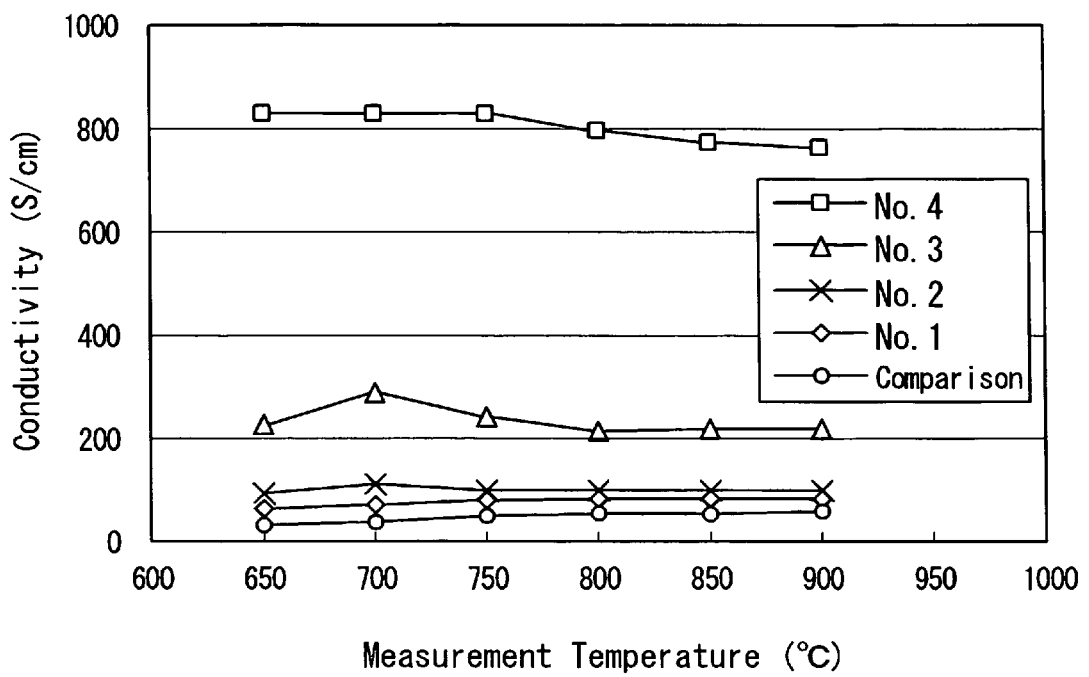
FIG. 4 is a graph showing conductivity of each air electrode contact material.

Conductivity [S/cm]=(1/Electric Resistance Measured Value [Ω])×Length of Material Painted Surface [cm]/Cross-Sectional Area of Material Painted Surface [cm$^2$])        Formula 3:

FIG. 4 shows the conductivity of each air electrode contact material. According to FIG. 4, any of the materials Nos. 1 to 4 has higher conductivity than the comparative air electrode contact material all over the temperature region.

Further, the conductivity of the materials Nos. 1 to 4 was improved as the content of the mixed Ag—Pd powder was increased. In particular, the material No. 4 in which the mixed Ag—Pd powder was made 70 wt % showed a high conductivity value of 800 S/cm.

As a result, the materials Nos. 1 to 4 were far more excellent in the conductivity than the conventional comparative material (i.e., the electric resistance was low), which is extremely advantageous for improving the generating performance of the SOFC.

[Preparation of Three-Layered Cell]

Next, a three-layered cell was prepared through the following procedure.

In detail, the above-mentioned 4ScSZ0.5A material was used as the dispersion strengthened solid electrolyte material, and a binder was added thereto to make slurry. The slurry was formed into an electrolyte green sheet of about 150 μm in thickness by the doctor blade method. The electrolyte green sheet was then sintered for 2 hours at 1350° C. to prepare an electrolyte sheet. Then, the electrolyte sheet was subjected to surface treatment by sandblast to prepare an electrolyte sheet with surface roughness of Rmax=6 μm, Rz=5 μm.

Next, NiO (produced by NACALAI TESQUE, INC.) and the above 10Sc1CeSZ material were weighed at the weight ratio of NiO:10Sc1CeSZ=4:6 where they are converted to Ni and ZrO$_2$, and then mixed for 24 hours using the ball mill and then dried. Then, slurry was made by adding a binder (polyethylene glycol) to the fuel electrode material, and it was painted (about 20 μm in thickness) on one side of the solid electrolyte sheet by the screen printing method. Besides, this fuel electrode material was diluted with ethanol and its particle size distribution was measured by using the diffraction-type particle size distribution measurement device (SALD-1100 by SHIMADZU CORPORATION), and it was shown that the 50% by volume diameter was 0.7 μm and the 90% by volume diameter was 4.3 μm.

Then, the fuel electrode material was sintered for 2 hours at 1350° C. to make a fuel electrode. Incidentally, NiO is reduced to be Ni when provided with hydrogen at the time of power generation and acts as a catalyst.

Next, $L_{0.6}S_{0.4}C_{0.2}F_{0.8}$ and 30SDC mentioned above were weighed at the weight ratio of $L_{0.6}S_{0.4}C_{0.2}F_{0.8}$:30SDC=8:2, and mixed for 24 hours using the ball mill, and then dried. Then, slurry was made by adding a binder (polyethylene glycol) to the air electrode material, and the slurry was painted (about 20 μm in thickness) on the other side of the solid electrolyte sheet by the screen printing method. Besides, the particle size distribution of this air electrode material was measured in the same way as the above fuel electrode material, and it was shown that the 50% by volume diameter was 2.9 μm and the 90% by volume diameter was 4.1 μm.

Then, the air electrode material was sintered for 2 hours at 850° C. to make an air electrode.

In this way, the three-layered cell was prepared in which the fuel electrode, the first solid electrolyte, and the air electrode are respectively comprised of Ni-10Sc1CeSZ, 4ScSZ0.5Al, and $L_{0.6}S_{0.4}C_{0.2}F_{0.8}$-30SDC.

[Preparation of Four-Layered Cell]

Next, a four-layered cell was prepared through the following procedure.

In detail, the four-layered cell was prepared following the same procedure as the three-layered cell except that the 6ScSZ0.5A material was used as the dispersion strengthened solid electrolyte material and the step of interposing the intermediate layer comprised of 20GDC was added prior to the step of bonding the air electrode to the electrolyte sheet.

For the intermediate layer material, slurry was made by adding a binder (polyethylene glycol) to the 20GDC material, and the slurry was painted (about 25 μm in thickness) on the other side of the solid electrolyte sheet by the screen printing method. Then, the intermediate layer was sintered for 2 hours at 1350° C. and bonded to the electrolyte sheet.

In this way, the four-layered cell was prepared in which the fuel electrode, the first solid electrolyte, the intermediate layer, and the air electrode are respectively comprised of Ni-10Sc1CeSZ, 6ScSZ0.5Al, 20GDC, and $L_{0.6}S_{0.4}C_{0.2}F_{0.8}$-30SDC.

[Preparation of Six-Layered Cell]

Next, a six-layered cell was prepared through the following procedure.

In detail, the six-layered cell was prepared following the same procedure as the four-layered cell except that the 4ScSZ0.5A material was used as the dispersion strengthened solid electrolyte material and the step of forming the fuel electrode contact layer on the fuel electrode surface and the air electrode contact layer on the air electrode surface was added.

Here, the fuel electrode contact layer and the air electrode contact layer were formed as follows.

First, the Ni powder (produced by IHARA TEC EXIMPORT CO., LTD.) was prepared as the first metal powder. Then, a binder (polyethylene glycol) was added thereto to make slurry. Then, the slurry was painted on the fuel electrode surface by the screen printing method to form a fuel electrode contact layer of about 15 82 m in thickness. Besides, the particle size distribution of the furl electrode contact material was measured in the same way as above, and it was shown that the 50% by volume diameter was 2.5 μm and the 90% by volume diameter was 6.2 μm.

Then, the slurry of the above-mentioned material No. 3 was painted on the air electrode surface by the screen printing method to form the air electrode contact layer of about 25 μm in thickness. Besides, the particle size distribution of the material No. 3 was measured in the same way as above, and it was shown that the 50% by volume diameter was 0.5 μm and the 90% by volume diameter was 1.9 μm.

In this way, the six-layered cell was prepared in which the fuel electrode contact layer, the fuel electrode, the first solid electrolyte, the intermediate layer, the air-electrode, and the air electrode contact layer are respectively comprised of Ni, Ni-10Sc1CeSZ, 4ScSZ0.5Al, 20GDC, $L_{0.6}S_{0.4}C_{0.2}F_{0.8}$-30SDC, and Ag-2% Pd+$L_{0.6}S_{0.4}C$.

[Preparation of Reference Cell B]

Next, a reference cell B was prepared. The reference cell B is comprised of the fuel electrode contact layer, the fuel electrode, the first solid electrolyte, the air electrode, and the air electrode contact layer. The differences between the reference cell B and each cell prepared above are provided below.

In the reference cell B, sandblast was provided on the electrolyte sheet surface comprised of 4ScSZ0.5Al so that the Ra value of surface roughness (in conformity with JIS B0601) is 0.075 or more and an S value is 16 or less. $L_{0.8}S_{0.2}$M-8YSZ was used as the air electrode material, and the sintering temperature at the time of bonding the air electrode to the electrolyte sheet was 1150° C. A Pd co-catalyst solution was impregnated into the air electrode in the amount of 0.1 mg/cm$^2$ when converted to a Pd weight. As the air electrode contact material, slurry containing $La_{0.8}Sr_{0.2}CoO_3$ (produced by SEIMI CHEMICAL CO., LTD., referred to as "$L_{0.8}S_{0.2}$C" hereinafter) was used.

[Power Generating Test]

Figure 5:
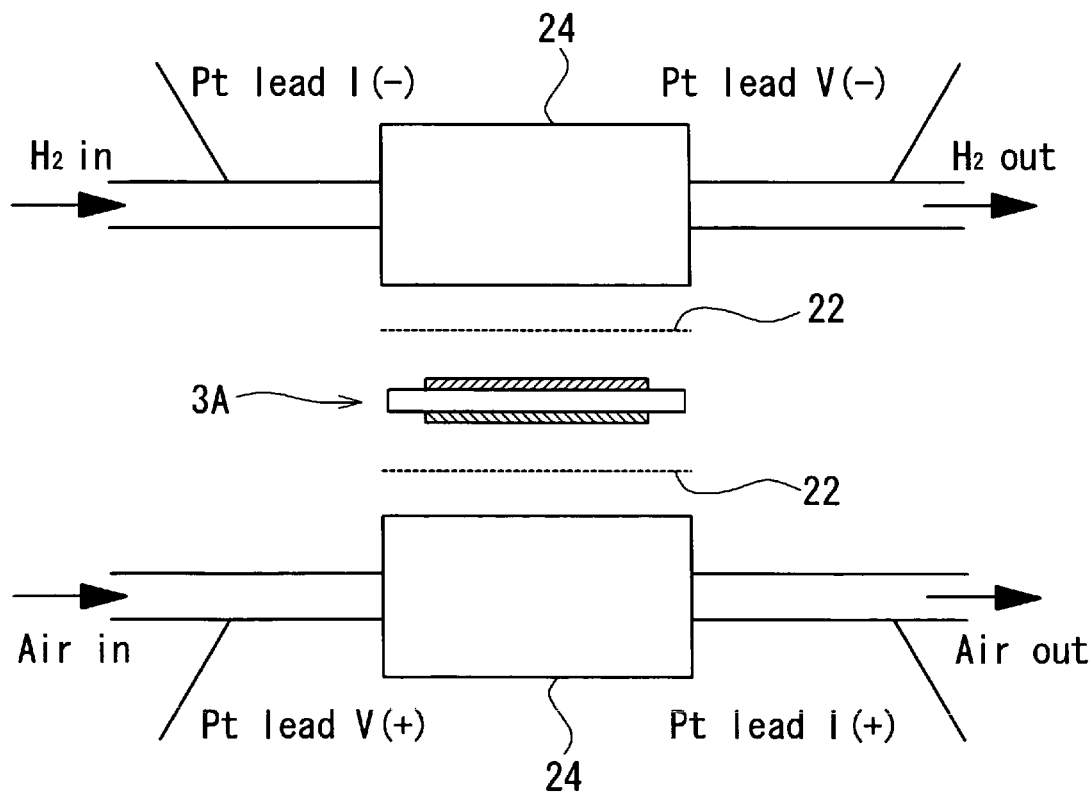
FIG. 5 is a schematic diagram of a power generating device.
Figure 6:
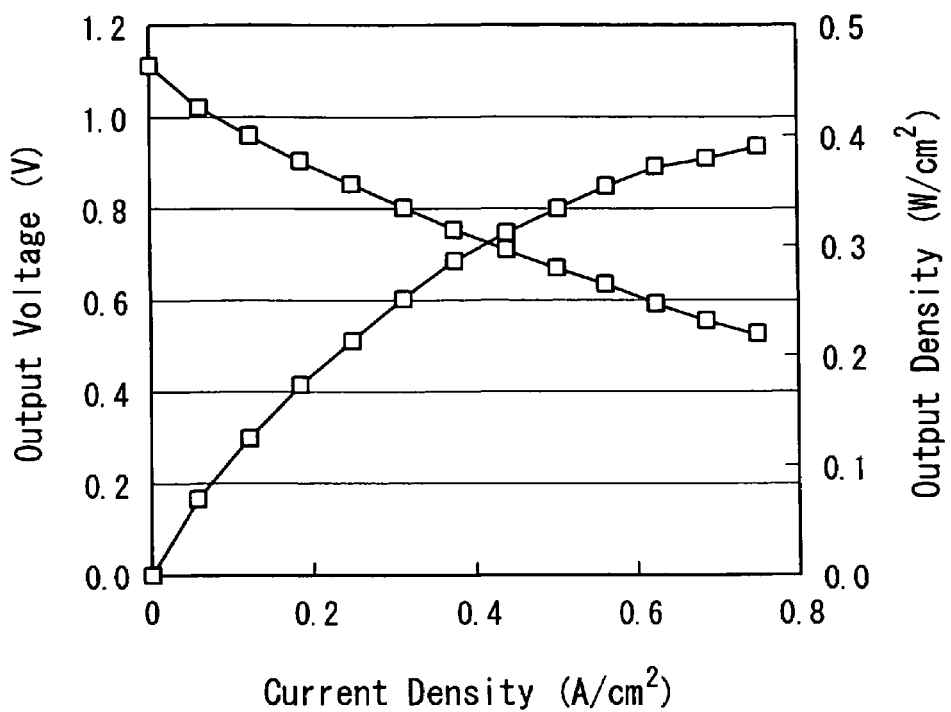
FIG. 6 is a graph showing the relationship between current density with output voltage and output density of the three-layered cell.
Figure 7:
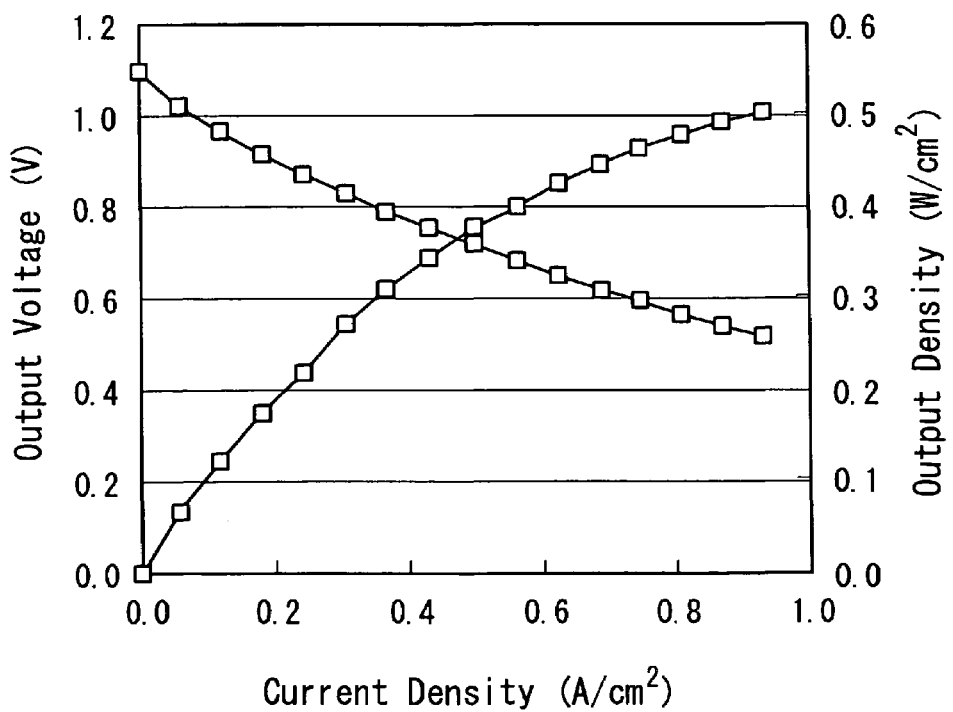
FIG. 7 is a graph showing the relationship between current density with output voltage and output density of the four-layered cell.
Figure 8:
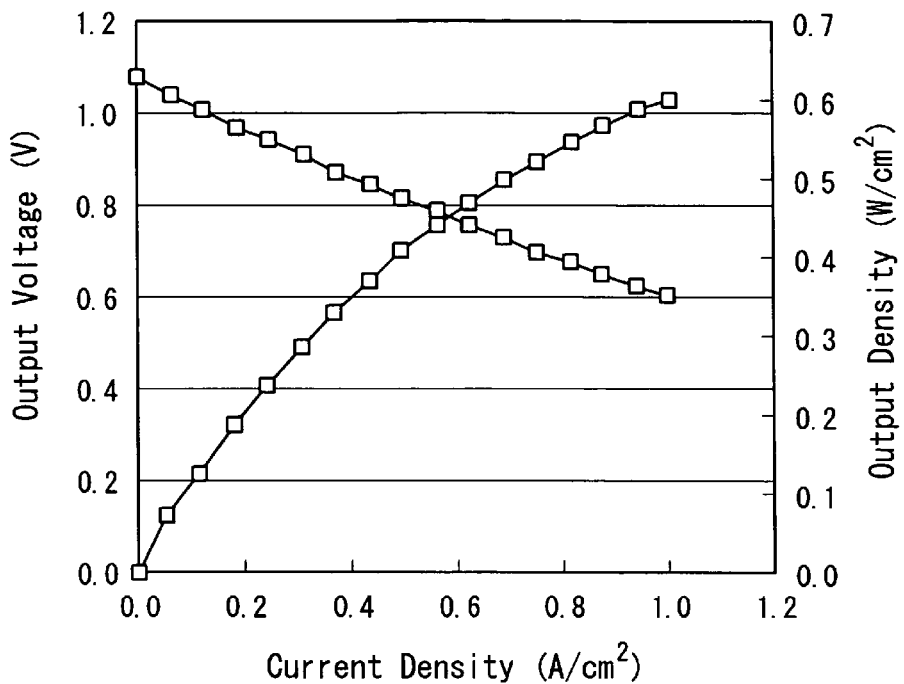
FIG. 8 is a graph showing the relationship between current density with output voltage and output density of the six-layered cell.
Figure 9:
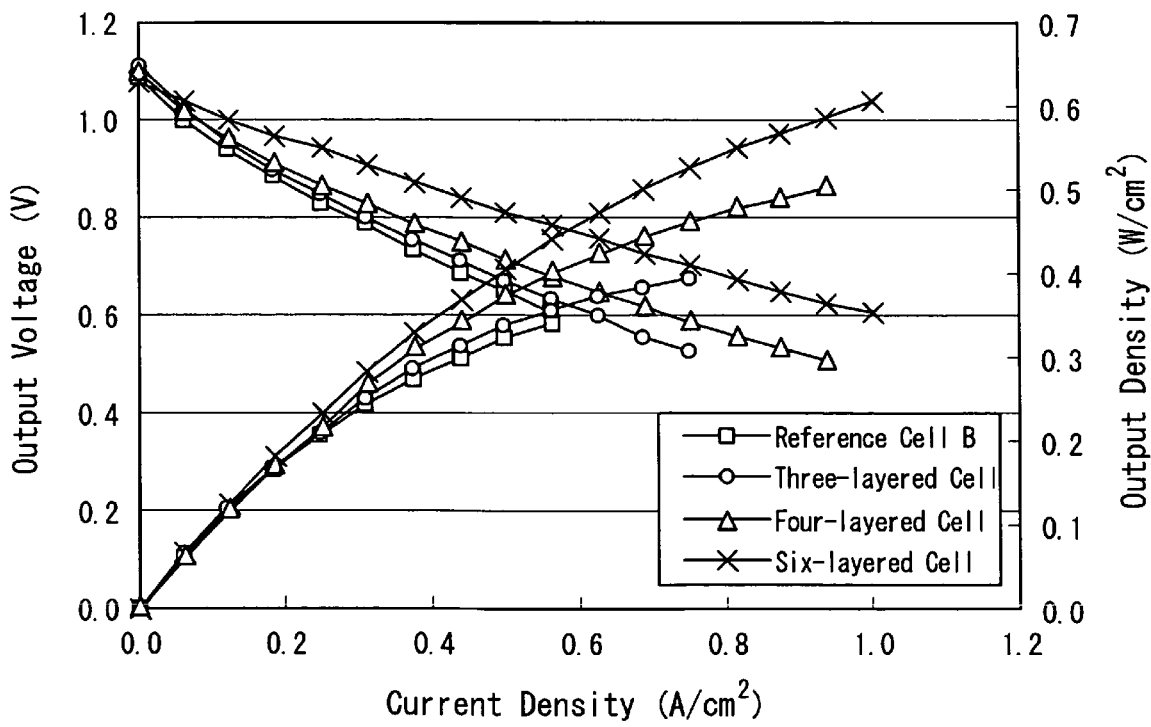
FIG. 9 is a graph in which the relationship between current density with output voltage and output density of the three-layered cell, the four-layered cell and the six-layered cell as well as a reference cell B are integrally shown.

Next, a power generating test was conducted by using each cell obtained as above. As shown in FIG. 5, both outermost surfaces of the single cell (with an electrode area of 16 cm$^2$ each, and in FIG. 5, the three-layered cell 3A is illustrated) were sandwiched between platinum meshes (80 mesh) 22, and gas manifolds (made of alumina) 24 were provided on the outer sides of the platinum meshes 22, and then hydrogen as the fuel gas (flow rate of 1 L/min) and air as the oxidant gas (flow rate of 1 L/min) were supplied thereto. Incidentally, a power generation temperature was 800° C., and the fuel gas was humidified at the humidity of 3% via a bubbler humidified by an oil bath.

FIGS. 6 to 9 show the relationship of the current density with the output voltage and the output density of the three-layered cell, the four-layered cell and the six-layered cell as well as the reference cell B.

As shown in FIGS. 6 to 9, when the current density was 0.5 A/cm$^2$, the area specific resistance ASR of the three-layered cell, the four-layered cell, the six-layered cell, and the reference cell B was 0.876 Ω cm$^2$, 0.762 Ω cm$^2$, 0.536 Ω cm$^2$, and 0.904 Ω cm$^2$, respectively.

In general, at a low temperature of 800° C., the reduction in the electrode activity is more remarkable in the air electrode than the fuel electrode. Therefore, though the reference cell B has reliability as a structure, the electrode activity of the air electrode is lowered at low temperatures, and it is considered to be inferior in the generating performance. Particularly, in the reference cell B, though the Pd co-catalyst solution was impregnated into the air electrode for improving the electrode activity, little effect thereof was shown at a low temperature of 800° C.

In contrast, as compared to the reference cell B, the three-, four- and six-layered cells are excellent in the generating performance even at a low temperature of 800° C. This is because in these cells, the electrode activity of the fuel and air electrodes was high and the cell reaction was stimulated even at a low temperature of 800° C.

As a result, the three-, four-, and six-layered cells consistent with the present invention enable to improve operation characteristics in the low-temperature region without impairing the generating performance and the reliability.

[Relation Between Outermost Cell Surface Shape and Generating Performance]

Next, a reference cell C was prepared following the same procedure as the three-layered cell except for using a fuel electrode material in slurry form in which the 50% by volume diameter is 10.4 μm and the 90% by volume diameter is 28.2 μm and an air electrode material in slurry form in which the 50% by volume diameter is 18.7 μm and the 90% by volume diameter is 33.1 μm.

Next, a reference cell D was prepared following the same procedure as the six-layered cell except for using a fuel electrode contact material in slurry form in which the 50% by volume diameter is 22 μm and the 90% by volume diameter is 34 μm and an air electrode contact material in slurry form in which the 50% by volume diameter is 16.8 μm and the 90% by volume diameter is 28.4 μm.

Next, a reference cell E was prepared following the same procedure as the six-layered cell except that the Ni powder of 21 μm in average particle size was used as the fuel electrode contact material and it was kneaded on the fuel electrode surface.

Then, the surface roughness Rmax, Rz of the electrode surfaces and the electrode contact layer surfaces of each cell above were measured by the laser optical non-contact 3D shape measurement device (MICROFOCUS EXPERT "UBC 14 System" by UBM CORPORATION). Major specifications of this device is such that the semiconductor laser source operates at a wavelength of 780 nm, the measurement range is ±50/±150 μm, there solution is 0.01% of the measurement range (0.01 μm at the maximum), and the spot diameter is 1 μm.

To be specific about the measurement method, a glass plate was placed on the stage of this device, and each single cell was placed thereon, and the position of the single cell was adjusted so that a sensor unit of the device can provide a scan of the total measurement length on the outermost cell surface of each cell. Besides, measurement specifications were set such that the measurement length was 4 mm or 12.5 mm, the scan velocity was 0.12 mm/sec, and the measurement pitch was 10 point/mm.

Also on the reference cells C to E, the power generating test was conducted under the same conditions as the above power generating-test. The test results are shown in Table 2.

TABLE 2

| Single Cell | | Rmax (μm) | Rz (μm) | Rmax/Rz | ASR (Ωcm$^2$) |
|---|---|---|---|---|---|
| Three-layered Cell | Fuel Electrode Surface | 13.9 | 10.5 | 1.5 | 0.876 |
| | Air Electrode Surface | 11.1 | 7.6 | 1.3 | |
| Four-layered Cell | Fuel Electrode Surface | 13.7 | 10.4 | 1.5 | 0.762 |
| | Air Electrode Surface | 12.0 | 7.9 | 1.3 | |
| Six-layered Cell | Fuel Electrode Contact Layer | 16.9 | 13.8 | 1.2 | 0.536 |
| | Air Electrode Contact Layer | 14.6 | 11.1 | 1.3 | |
| Reference Cell C | Fuel Electrode Surface | 27.8 | 23.2 | 1.2 | 1.07 |
| | Air Electrode Surface | 25.2 | 21.5 | 1.2 | |

TABLE 2-continued

|  | Single Cell | Rmax (μm) | Rz (μm) | Rmax/ Rz | ASR (Ωcm$^2$) |
|---|---|---|---|---|---|
| Reference Cell D | Fuel Electrode Contact Layer | 33.4 | 26.5 | 1.3 | 0.95 |
|  | Air Electrode Contact Layer | 29.2 | 21.9 | 1.3 |  |
| Reference Cell E | Fuel Electrode Contact Layer | 58.7 | 24.3 | 2.4 | Data not obtained due to cell breakage |
|  | Air Electrode Contact Layer | 14.6 | 11.1 | 1.3 |  |

According to Table 2, the three-, four- and six-layered cells using the electrode materials and the electrode contact materials in which the particle size constitution was adjusted to fall within the predetermined range had Rmax and Rz within the above-specified ranges. To the contrary, the reference cells C to E using the electrode materials and the electrode contact materials in which the particle size constitution was not adjusted to fall within the predetermined range did not have Rmax and Rz within the above-specified ranges.

[Flatness of Cell]

Quality verification was made on the three-layered cell and the reference cell E. In detail, the load test was conducted on the respective cells while sandwiching them between glass plates (5 mm in thickness) having a plain surface with a universal material testing machine (4301 type by INTRON JAPAN Co., LTD.) under the conditions that the crosshead speed was 0.5 mm/min, and the load imposed was 0.2 kgf/cm$^2$.

Then, visual observations were made on the three-layered cell and the reference cell E. In the reference cell E, fractures and/or cracks were identified in the Ni powder as protrusions. On the other hand, in the three-layered cell, no fractures and/or cracks were identified.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A single cell for a low operating temperature solid oxide fuel cell, the single cell comprising:
   a first solid electrolyte having an oxide ion conductivity at 800° C. of at least 0.015 S/cm and a bending strength of at least 600 MPa;
   a fuel electrode bonded to one side of the first solid electrolyte, the fuel electrode comprising a cermet of a catalyst and a second solid electrolyte having an oxide ion conductivity at 800° C. of at least 0.08 S/cm;
   an air electrode bonded to the other side of the first solid electrolyte, the air electrode comprising a compound of a first perovskite type oxide with a third solid electrolyte; and
   an intermediate layer comprising a fourth solid electrolyte interposed between the air electrode and the first solid electrolyte;
   wherein a surface roughness of the fuel electrode is in a range of 5 to 25 μm in maximum roughness depth and in a range of 3 to 20 μm in average roughness height Rz; and
   wherein a surface roughness of the air electrode is in a range of 3 to 20 μm in maximum roughness depth Rmax and in a range of 2 to 18 μm in average roughness height Rz, when measured by a laser optical non-contact 3D shape measurement device.

2. The single cell according to claim 1, wherein a surface roughness of the first solid electrolyte is in a range of 3 to 15 μm in maximum roughness depth Rmax and in a range of 2 to 10 μm in average roughness height Rz, when measured by the laser optical non-contact 3D shape measurement device.

3. A single cell for a low operating temperature solid oxide fuel cell, the single cell comprising:
   a first solid electrolyte having an oxide ion conductivity at 800° C. of at least 0.015 S/cm and a bending strength of at least 600 MPa;
   a fuel electrode bonded to one side of the first solid electrolyte, the fuel electrode comprising a cermet of a catalyst and a second solid electrolyte having an oxide ion conductivity at 800° C. of at least 0.08 S/cm;
   a fuel electrode contact layer coating a surface of the fuel electrode and comprising a fuel electrode contact material containing at least a first metal powder;
   an air electrode bonded to the other side of the first solid electrolyte, the air electrode comprising a compound of a first perovskite type oxide with a third solid electrolyte;
   an air electrode contact layer coating a surface of the air electrode and comprising an air electrode contact material containing at least a second metal powder and a second perovskite type oxide powder; and
   an intermediate layer comprising a fourth solid electrolyte interposed between the air electrode and the first solid electrolyte;
   wherein surface roughness of the fuel electrode contact layer is in a range of 5 to 25 μm in maximum roughness depth Rmax and in a range of 3 to 22 μm in average roughness height Rz, and a surface roughness of the air electrode contact layer is in a range of 3 to 24 μm in maximum roughness depth Rmax and in a range of 2 to 20 μm in average roughness height Rz, when measured by a laser optical non-contact 3D shape measurement device.

4. The single cell according to claim 3, wherein a surface roughness of the first solid electrolyte is in a range of 3 to 15 μm in maximum roughness depth Rmax and in a range of 2 to 10 μm in average roughness height Rz, when measured by the laser optical non-contact 3D shape measurement device.

* * * * *